US008245045B2

(12) United States Patent
Benameur et al.

(10) Patent No.: US 8,245,045 B2
(45) Date of Patent: Aug. 14, 2012

(54) COMPUTER-IMPLEMENTED METHODS, SYSTEMS AND COMPUTER PROGRAM PRODUCTS FOR GENERATING AND VERIFYING SIGNATURES

(75) Inventors: Azzedine Benameur, Caromb (FR); Smriti Kumar Sinha, Tezpur (IN); Paul El Khoury, Antibes (FR)

(73) Assignee: SAP AG, Walldorf (DE)

( * ) Notice: Subject to any disclaimer, the term of this patent is extended or adjusted under 35 U.S.C. 154(b) by 381 days.

(21) Appl. No.: 12/568,307

(22) Filed: Sep. 28, 2009

(65) Prior Publication Data

US 2010/0082993 A1  Apr. 1, 2010

(30) Foreign Application Priority Data

Oct. 1, 2008 (EP) .................................. 08290923

(51) Int. Cl.
*H04L 29/06* (2006.01)
*G06F 7/04* (2006.01)
(52) U.S. Cl. .............................. 713/176; 713/181; 726/9
(58) Field of Classification Search .................. 713/176, 713/181; 726/9
See application file for complete search history.

(56) References Cited

U.S. PATENT DOCUMENTS

| 2005/0149729 | A1 | 7/2005 | Zimmer et al. | |
| 2008/0095360 | A1* | 4/2008 | Vuillaume et al. | 380/44 |
| 2009/0235078 | A1* | 9/2009 | Futa et al. | 713/176 |

FOREIGN PATENT DOCUMENTS

EP  1496438 A1  1/2005

OTHER PUBLICATIONS

"European Application Serial No. 08290923.5, European Search Report mailed May 6, 2009", 10 pgs.
"OASIS Web Services Security (WSS) TC", [Online]. Retrieved from the Internet: <URL: http://www.oasis-open.org/committees/tc_home.php?wg_abbrev=wss>,(Feb. 21, 2006),4 pgs.
"Simple Object Access Protocol (SOAP) 1.1", *W3C Note*, [Online]. Retrieved from the Internet: <URL: http://www.w3.org/TR/2000/NOTE-SOAP-20000508/>,(May 8, 2000),35 pgs.

(Continued)

*Primary Examiner* — Mohammad Reza
(74) *Attorney, Agent, or Firm* — Schwegman, Lundberg & Woessner, P.A.

(57) ABSTRACT

The present description refers in particular to example computer-implemented methods, example computer program products, and example computer systems for automatically generating or verifying a digital signature for a message. The message may be representable in a hierarchical tree structure. An example computer-implemented method may comprise: selecting, from a message $M_T$, a sub-message M to be signed, the sub-message M comprising at least one element; generating a well-formed context $C_M^t$ for the sub-message M, wherein the well-formed context $C_M^t$ defines a derivation path to the element in the message $M_T$ at a time t, the element being marked [M] in the well-formed context $C_M^t$; generating a message digest $\delta_M$ from the sub-message M and a context digest $\delta_C$ from the well-formed context $C_M^t$; and generating a signature S by applying a secret key $S_A$ of a user A to the message digest $\delta_M$ and to the context digest $\delta_C$.

20 Claims, 8 Drawing Sheets

OTHER PUBLICATIONS

"XML Signature Syntax and Processing (Second Edition)", [Online]. Retrieved from the Internet: <URL: http://www.w3.org/TR/xmldsig-core/>,(Jun. 10, 2008),63 pgs.

Benameur, Azzedine, et al., "XML Rewriting Attacks: Existing Solutions and their Limitations", [Online]. Retrieved from the Internet: <URL: http://arxiv.org/ftp/arxiv/papers/0812/0182.4181.pdf>,(Apr. 2008),9 pgs.

Bhargavan, Karthikeyan, et al., "TulaFale: A Security Tool for Web Services", [Online]. Retrieved from the Internet: <URL: http://research.microsoft.com/en-us/um/people/fournet/papers/tulafale-a-security-tool-for-web-services.pdf>,26 pgs.

Gajek, Sebastian, et al., "Breaking and Fixing the Inline Approach", *Proceedings of the 2007 ACM Workshop on Secure Web Services*, [Online]. Retrieved from the Internet: <URL: http://delivery.acm.org/10.1145/1320000/1314425/p37-gajek.pdf>,(Nov. 2007),37-43.

McIntosh, Michael, et al., "XML Signature Element Wrapping Attacks and Countermeasures", *Proceedings of the 2005 Workshop on Secure Web Services*, [Online]. Retrieved from the Internet: <URL: http://delivery.acm.org/10.1145/1110000/1103026/p20-mcintosh.pdf>,(Nov. 11, 2005),20-27.

Murata, Makoto, et al., "Taxonomy of XML Chema Languages Using Formal Language Theory", *ACM Transactions on Internet Technology* vol.5, No. 4, (Nov. 2005),660-704.

Rahaman, Mohammad A., et al., "Distributed Access Control for XML Document Centric Collaborations", *12th International IEEE Enterprise Distributed Object Computing Conference*, (Sep. 15, 2008),267-276.

Rahaman, Mohammad A., et al., "Towards Secure Soap Message Exchange in a SOA", [Online]. Retrieved from the Internet: <URL: www.eurecom.fr/util/publidownload.en.htm?id=2692>,8 pgs.

Saadi, Rachid, et al., "Context Adapted Certificate Using Morph Template Signature for Pervasive Environments", *Lecture Notes in Computer Science* vol. 4836, (Nov. 25, 2007),17-32.

Saadi, Rachid, et al., "X316 Security Toolbox for New Generation of Certificate", *Lecture Notes in Computer Science* vol. 4657, (Sep. 3, 2007),248-258.

Sinha, Smriti K., et al., "A Formal Solution to Rewriting Attacks on SOAP Messages", *Security in Proceedings of the 2008 ACM workshop on Secure Web Services*, [Online]. Retrieved from the Internet: <URL: http://delivery.acm.org/10.1145/1460000/1456501/p53-sinha.pdf?key1=1456501&key2=8287650421&col=GUIDE&CFID=32611567&cftoken=32433721>,(Oct. 31, 2008),53-60.

* cited by examiner

COMPUTER-IMPLEMENTED METHODS, SYSTEMS AND COMPUTER PROGRAM PRODUCTS FOR GENERATING AND VERIFYING SIGNATURES

CLAIM OF PRIORITY

The present patent application claims the priority benefit of the filing date of European Application (EPO) No. 08290923.5 filed Oct. 1, 2008, the entire content of which is incorporated herein by reference.

TECHNICAL FIELD

The description is generally directed to securing message exchange in distributed systems, in particular, to preventing rewriting attacks on electronic messages, and, more particularly, to a computer-implemented method, a computer program product, and a computer system for automatically generating a digital signature for a message and to a computer-implemented method, a computer program product, and a computer system for automatically verifying a digital signature of a message. A message is representable in a hierarchical tree structure.

BACKGROUND

Distributed systems may be realized by a Service Oriented Architecture (SOA), wherein communication between web services may be realized using electronic messages (e.g. XML-based messages such as SOAP messages). Said messages may be prone to attacks. Said attacks may involve a plurality of consequences such as unauthorized access, disclosure of information, and/or identity theft. Basically, said attacks may relate to modifications of the messages, which, therefore, may be classified as rewriting attacks, and more particularly as XML rewriting attacks. In particular, said attacks may exploit a weakness of XML Signature (i.e. the W3C recommendation "XML Signature Syntax and Processing"), which may be used to sign electronic messages. Specifically, SOAP is a widely established message structure specification used for exchanging messages between web services in a SOA environment. SOAP may use the W3C XML Signature specification as a security mechanism to address proof of origin and content integrity issues of XML-based messages. The W3C XML Signature specification enables the signing of not only a whole message but also one or more sub-sets of a message, referred to as a sub-message hereinafter. Signing only a sub-message using the W3C XML Signature specification may enable security attacks (e.g. rewriting attacks) on electronic messages and may make secure message exchange vulnerable.

It should be understood that a signature defined according to the W3C XML Signature specification is referred to as an XML signature throughout the text.

SUMMARY

In one general aspect, a computer-implemented method for automatically generating a digital signature for a message, the message being representable in a hierarchical tree structure is provided. The method may comprise:

selecting, from a message $M_T$, a sub-message M to be signed, the sub-message M comprising at least one element;

generating a well-formed context $C_M^t$ for the sub-message M, wherein the well-formed context G defines a derivation path to the element in the message $M_T$ at a time t, the element being marked [M] in the well-formed context $C_M^t$;

generating a message digest $\delta_M$ from the sub-message M and a context digest $\delta_C$ from the well-formed context $C_M^t$; and generating a signature S by applying a secret key $s_A$ of a user A to the message digest $\delta_M$ and to the context digest $\delta_C$.

At least a sub-message of a message is signed using a context-sensitive signature. The signature may be based on a message digest and a context digest. The message is representable as a tree and the sub-message is representable as a sub-tree of said tree. The message and the sub-message may each comprise one or more elements which are representable as nodes of the tree and the sub-tree, respectively. The message digest may, for example, be computed by applying a one-way hash function to the sub-message and the context digest may be computed by, for example, applying the one-way hash function to the well-formed context. The well-formed context may define an unambiguous derivation path to a marked element of the sub-message through the tree representation of the message. The marked element may represent the root of the sub-tree representation of the sub-message. In other words, the well-formed context may unambiguously define a position or a coordinate of the sub-message in the message at a point in time. Furthermore, the well-formed context may define a tree representation of the message at said point in time. The sub-message therefore may derive its semantics from the well-formed context. Consequently, the signature may capture the well-formed context of the signed sub-message at the time of signing, and incorporate the signed message context in the message, making changes (e.g. rewriting attacks) to the message detectable.

In another general aspect, a computer-implemented method for automatically verifying a digital signature of a message, the message being representable in a hierarchical tree structure is provided. The method may comprise: receiving a message $M_T$ comprising a signature S, wherein the signature S is associated with a well-formed context $C_M^t$; selecting, from the message $M_T$, a sub-message M to be verified; decrypting the signature S with a public key $p_A$ of a user A, the decrypted signature comprising a message digest $\delta_M$ and a context digest $\delta_C$; generating a further message digest $\delta'_M$ from the sub-message M and a further context digest $\delta'_C$ from the well-formed context $C_M^t$ and verifying the signature S by checking:

whether the further context digest $\delta'_C$ equals the context digest $\delta_C$, whether the sub-message M is in a derivation path through the message $M_T$ to a marked element [M], wherein the derivation path is generated from the well-formed context $C_M^t$, and whether the further message digest $\delta'_M$ equals the message digest $\delta_M$.

Verifying a context-sensitive signature may comprise verifying that the original message is signed by the owner and/or sender of the message and furthermore that the message is in the well-formed context.

According to another aspect, the well-formed context $C_M^t$ may be generated by one or more well-formed production rules of a regular tree grammar (RTG), the well-formed production rules being used to define the derivation path to the element [M] (24) in the message $M_T$ (20).

According to yet another aspect, the well-formed production rules may unambiguously define only said derivation path through the message $M_T$ to the element [M].

According to yet another aspect, a regular expression occurring in at least one of the one or more well-formed production rules and comprising multiple occurrences of an element may be replaced by an equivalent regular expression determining one of the multiple occurrences of said element to be used in the derivation path.

In other words, a well-formed context of a message (or of a sub-message of a message) may be generated by determining one or more unambiguous and well-formed production rules of a regular tree grammar, and by segregating and selecting an element (i.e. the marked element being representable by a node of the tree). The segregated and marked element may represent the root of the tree/sub-tree representing the message to be signed. The regular tree grammar may be used to derive the tree/sub-tree representation of the message. By executing the one or more production rules, a unique path through a message from the root of the message to the marked element may be derived. Said path is referred to as derivation path. Due to the definition of a well-formed context, the derivation path is unambiguous and unique.

According to yet another aspect, the method may further comprise: storing the signature S and the well-formed context $C_M^t$ in an information element of the message $M_T$.

According to yet another aspect, the method may further comprise:

incorporating the sub-message M in a new message $M_{T2}$; generating a new well-formed context $C_M^{tc}$ for the sub-message, wherein the new well-formed context $C_M^{tc}$ defines a new derivation path to the element [M] in the new message $M_{T2}$ at a time $t_C$; and generating a new signature $S_2$ comprising the sub-message M, which is signed by the user A, and the new well-formed context $C_M^{tc}$ signed by a user B.

In another general aspect there is provided a computer-program product comprising computer readable instructions, which when loaded and run in a computer system and/or computer network system, cause the computer system and/or the computer network system to perform a method as described.

In yet another general aspect, a computer system for automatically generating a digital signature for a message, the message being representable in a hierarchical tree structure is provided. The system may comprise a first system of a distributed network, the first system may be operable to: select, from a message $M_T$, a sub-message M to be signed, the sub-message M comprising an element;

generate a well-formed context $C_M^t$ for the sub-message M, wherein the well-formed context G defines a derivation path to the element in the message $M_T$ at a time t, the element (24) being marked [M] in the well-formed context $C_M^t$;

generate a message digest $\delta_M$ from the sub-message M and a context digest $\delta_C$ from the well-formed context $C_M^t$; and generate a signature S by applying a secret key $s_A$ of a user A to the message digest $\delta_M$ and to the context digest $\delta_C$.

In yet another general aspect, a computer system for automatically verifying a digital signature of a message, the message being representable in a hierarchical tree structure, is provided. The system may comprise a second system of a distributed network, the second system may be operable to:

receive a message $M_T$ comprising a signature S, wherein the signature S is associated with a well-formed context $C_M^t$;

select, from the message $M_T$, a sub-message M to be verified;

decrypt the signature S with a public key $p_A$ of a user A, the decrypted signature comprising a message digest $\delta_M$ and a context digest $\delta_C$;

generate a further message digest $\delta'_M$ from the sub-message M and a further context digest $\delta'_C$ from the well-formed context $C_M^t$; and verify the signature S by checking:

whether the further context digest $\delta'_C$ equals the context digest $\delta_C$, whether the sub-message M is in a derivation path through the message $M_T$ to a marked element [M], wherein the derivation path is generated from the well-formed context $C_M^t$, and whether the further message digest $\delta'_M$ equals the message digest $\delta_M$.

According to yet another aspect, the systems may be further operable to perform operations according to any one of the above methods.

In yet another aspect, a computer system for automatically generating a digital signature for a message, the message being representable in a hierarchical tree structure, is provided. The system may comprise:

a message selector operable to select, from a message $M_T$, a sub-message M to be signed, the sub-message M comprising an element;

a context generator operable to generate a well-formed context $C_M^t$ for the sub-message M, wherein the well-formed context G defines a derivation path to the element in the message $M_T$ at a time t, the element (24) being marked [M] in the well-formed context $C_M^t$;

a digest generator operable to generate a message digest $\delta_M$ from the sub-message M and a context digest $\delta_C$ from the well-formed context $C_M^t$; and a signature generator operable to generate a signature S by applying a secret key $s_A$ of a user A to the message digest $\delta_M$ and to the context digest S.

In yet another aspect, a computer system for automatically verifying a digital signature of a message, the message being representable in a hierarchical tree structure is provided The system may comprise:

a receiver operable to receive a message $M_T$ comprising a signature S, wherein the signature S is associated with a well-formed context $C_M^t$;

a message selector operable to select, from the message $M_T$, a sub-message M to be verified;

a decryptor operable to decrypt the signature S with a public key $p_A$ of a user A, the decrypted signature comprising a message digest $\delta_M$ and a context digest $\delta_C$;

a digest generator operable to generate a further message digest $\delta'_M$ from the sub-message M and a further context digest $\delta'_C$ from the well-formed context $C_M^t$; and a verificator operable to verify the signature S by checking:
whether the further context digest $\delta'_C$ equals the context digest $\delta_C$,
whether the sub-message M is in a derivation path through the message $M_T$ to a marked element [M], wherein the derivation path is generated from the well-formed context $C_M^t$, and whether the further message digest $\delta'_M$ equals the message digest $\delta_M$.

The subject matter described in this specification can be implemented as a method or as a system, using computer program products or a machine readable medium, tangibly embodied in information carriers, such as a CD-ROM, a DVD-ROM, a semiconductor memory, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various machines.

Details of one or more implementations are set forth in the accompanying exemplary drawings and exemplary description below. Other features will be apparent from the description and drawings, and from the claims.

TECHNICAL TERMS

Figure 1:
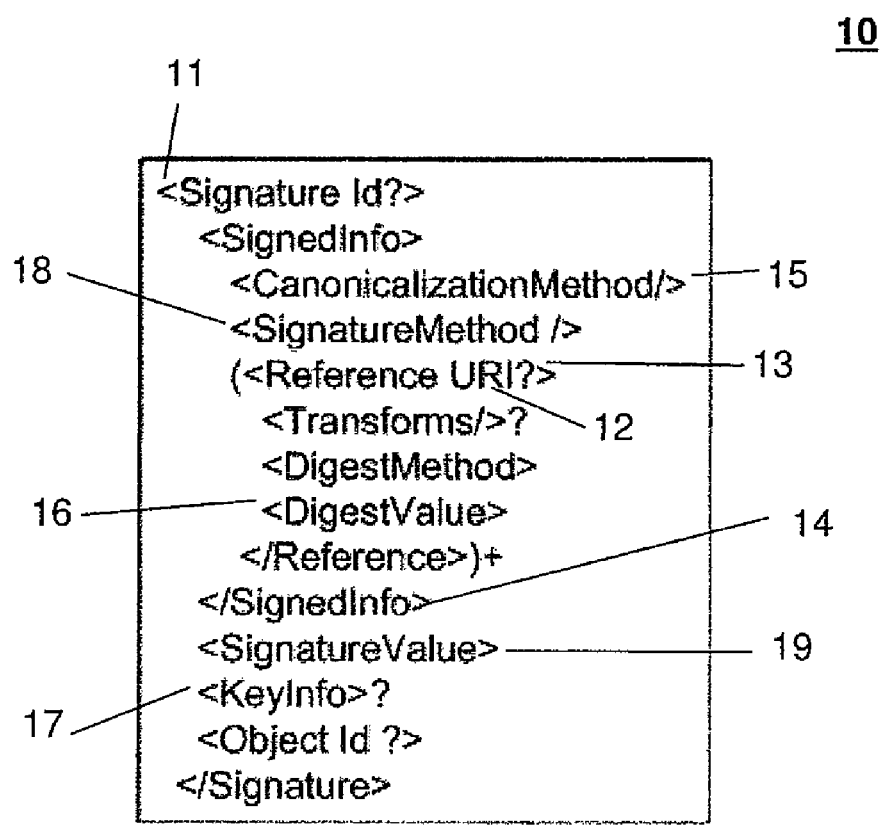
FIG. 1 shows an example of a signature structure according to XML Signature.

The following technical terms are used throughout the description. The terms may refer to but are not limited to the subsequently given explanations.

Digital Signature

A digital signature may be a type of asymmetric cryptography used to simulate security properties of a handwritten signature on a paper for an electronic document such as a message communicated over a network. In order to generate and verify a digital signature at least a key generation algorithm, a signature algorithm, and a verification algorithm may be used. Basically, a digital signature may provide authentication of data, e.g. a text document such as a message. A digital signature may also provide non-repudiation. Non-repudiation may relate to the aspect that the authenticity of a signed message may be publicly verified and not only by a single intended recipient. Messages may relate to an electronic mail, a contract, a message sent in a more complicated cryptographic protocol, and/or an XML-based message such as a SOAP message used for communication between (SOA) web services. The key generation algorithm may be based on a public-key cryptographic method, comprising selecting a secret key (or a private key) uniformly at random and outputting the secret key and a corresponding public key, i.e. the conjugate public key to the secret key. The signature algorithm may generate, given a message and a secret key, a signature. Given a message, a public key, and a signature, the verification algorithm may validate the signature. Examples of digital signatures are RSA-based signatures such as RSA and RSA-PSS, ELGamal signatures, DSA, ECDSA and/or variants thereof.

Tree

In the field of computing, a tree is a data structure that may emulate a tree structure with a set of linked nodes. By convention, trees grow down in computing (not up as they do in nature). The nodes may be linked by edges. Basically, a tree may be an acyclic and connected graph. Furthermore, the edges of a tree may be undirected or directed. A node may represent an element (e.g. an element of a message) and may comprise at least one value, a condition, or may represent a separate tree of its own. A node of a tree may have zero or more child nodes, which are below in the tree. A node having a child node may be called the child's parent node. A node has at most one parent node. The topmost node in a tree may be referred to as root node or root. Nodes at the bottommost level of the tree may be called leaf nodes or leafs. An inner node is any node of a tree that has one or more child nodes and is thus not a leaf. A sub-tree may be a portion of a tree which may be considered as a complete tree by itself. Any node in a tree, together with all nodes that are below said node (i.e. the child nodes of said node), may define a sub-tree of the tree. Said node then represents the root of the sub-tree. A path to a node through a tree may be a connected downward path (i.e. a sequence of one or more nodes following the edges between said nodes) from the root of the tree to said node. XML-based data may be represented by a tree. For example, an XML-based message and an XML signature both inherently have a corresponding tree representation.

Regular tree grammar

In the field of computing, a regular tree grammar may be a formal grammar which allows for generating specific regular trees. A formal grammar may be a precise specification of a formal language, i.e. a set of strings over an alphabet. In other words, a grammar may describe which of the possible sequences of symbols (e.g. strings, nodes) in a language constitute valid words (e.g. trees) or statements (e.g. sub-trees) in said language.

Regular Expression

In the field of computing, regular expressions may provide a concise and flexible means for identifying elements of data of interest following one or more rules. Regular expressions may comprise constants and operators that denote sets of strings (or elements) and operations over said sets, respectively.

Rewriting

In the field of computing, rewriting may relate to a plurality of non-deterministic methods of replacing sub-terms of a formula with other terms. Basically, a rewriting system may comprise a set of terms and one or more rules how to transform said terms. Non-deterministic may relate to the aspect that one rule to rewrite a term could be applied in one or more different ways to said term, or more than one rule could be applicable to a term. Rewriting may be applied to trees, wherein a tree may be considered as a formula and wherein one or more sub-trees may be replaced by other sub-trees such that the structure of the original tree is changed or modified.

It should be understood that in the following text the term "signature" refers to a digital signature and that the term "message" refers to an electronic document such as an XML-based message. A message may comprise one or more sub-messages, wherein the message is representable by a tree and the sub-messages are representable by sub-trees of said tree. An element of the message is representable by a node of said tree. A sub-message may comprise one or more elements of the message. In order to clearly differentiate between a message and a sub-message, a message is denoted by $M_T$ and a sub-message is denoted by M. In case it is clear from the description context that a message M possibly relates only to a sub-message of a whole message $M_T$, the term message is used. Otherwise, the message is explicitly referred to as sub-message M of a message $M_T$. The expression "signed message" or "message to be signed" refers to a message comprising at least a sub-message being or to be signed by a signature. It should also be understood that a "context", as used throughout the text, refers to a "well-formed context".

DETAILED DESCRIPTION

In the following text, a detailed description of examples will be given with reference to the drawings. It should be understood that various modifications to the examples may be made. In particular, elements of one example may be combined and used in other examples to form new examples.

FIG. 1 shows an example of a schema for XML signatures according to the W3C XML

Signature specification ("XML Signature Syntax and Processing, $2^{nd}$ edition"). XML Signature is a W3C recommendation that defines an XML-based syntax for digital signatures. The W3C XML Signature specification can be used to sign data of any type that is accessible via a URI (e.g. an XML document, an XML-based message such as a SOAP message). A URI may refer to a URL, a URN, and/or other unified resource identifiers. SOAP is a protocol for exchanging XML-based messages over computer networks, e.g. using HTTP/HTTPS. SOAP messages are usable to carry data and/or information from one service (e.g. web service) to another. In the following the term "XML signature" refers to a digital signature being defined using the W3C XML Signature specification. In case a different kind of a (possibly XML-based) signature is referred to, the term "signature" or a further specification thereof is used.

An example schema for an XML signature 10 shown in FIG. 1 is a 2-tuple signature where at least one signed element is referenced by its URI 12 under at least one reference-element 13.

XML signatures may be prone to attacks, in particular, to XML rewriting attacks mainly due to the verification process used to validate an XML signature. The verification process for XML signatures is performed through the following two successive operations.

In a first operation, a reference of an XML signature is verified. This operation may be referred to as reference validation. A SignedInfo element 14 of the XML signature structure is canonicalized using a specified CanonicalizationMethod 15 of XML Signature. Canonicalization may relate to a process for converting data that has more than one possible representation into a standard, i.e. a canonical representation. Subsequently, for each reference element 13, a corresponding referenced element is retrieved and a digest value is computed and compared to a value in a DigestValue element 16 stored under the at least one reference element 13. For example, the reference, i.e. the URI attribute having value #1 of the reference element 13-1 shown in FIG. 2 references the element body 24 having the identifier ID 1. If this reference validation is successful, then a second operation is executed. Otherwise, an error message is generated.

In a second operation, the signature itself of the XML signature is verified. This operation may be referred to as signature validation. Key information regarding a cryptographic key used for signing and verifying the signature is retrieved from a KeyInfo element 17. Alternatively, the corresponding key information may be retrieved from an external source. A signature algorithm used by the W3C XML Signature specification is defined under a SignatureMethod element 18. The KeyInfo element 17 and the SignatureMethod element 18 are then used to validate a signature value for the referenced element stored in a SignatureValue element 19.

Using an XML signature it is possible to sign non-continuous elements of a message separately. According to XML Signature, at least one element to be signed of a message is referenced by an indirection (in particular, a URI 12) of at least one reference element 13 used in the XML signature. Said indirect referencing comprises no information about an actual location of the at least one referenced and signed element in the message. This may lead to rewriting attacks, in particular, XML rewriting attacks, where the at least one element can be relocated in the tree representation of the message and the XML signature still remains valid. In other words, at least one element of a message signed using an XML signature may be relocated in the message without making the XML signature invalid as long as the indirect referencing remains valid. Furthermore, the message itself can be altered without affecting the validity of the at least one signed element.

Given a message and an XML signature for at least one element of the message, an XML rewriting attack relates to an exploitation of the tree representation of the message by reordering one or more nodes of the tree and/or by wrapping one or more nodes of the tree without altering the XML signature. An XML rewriting attack on the message is possible because the XML signature may be formally described in terms of a context-free signature. In particular, since according to the XML signature, the at least one signed element is indirectly referenced in the tree representation of the message, the XML signature remains valid until equality of at least one value of at least one element referenced by the URI 12 in the reference element 13 with at least one value of an ID attribute of the referenced element holds. Based on said weakness of the W3C XML Signature specification, substantially three types of XML rewriting attacks may be applied to messages signed using an XML signature.

Examples of XML rewriting attacks on SOAP messages, which cannot be prevented by an XML signature are exemplary shown with reference to FIGS. 2 to 5. It should be understood that similar rewriting attacks may be performed on messages other than SOAP messages, which are merely used as an example.

Figure 2:
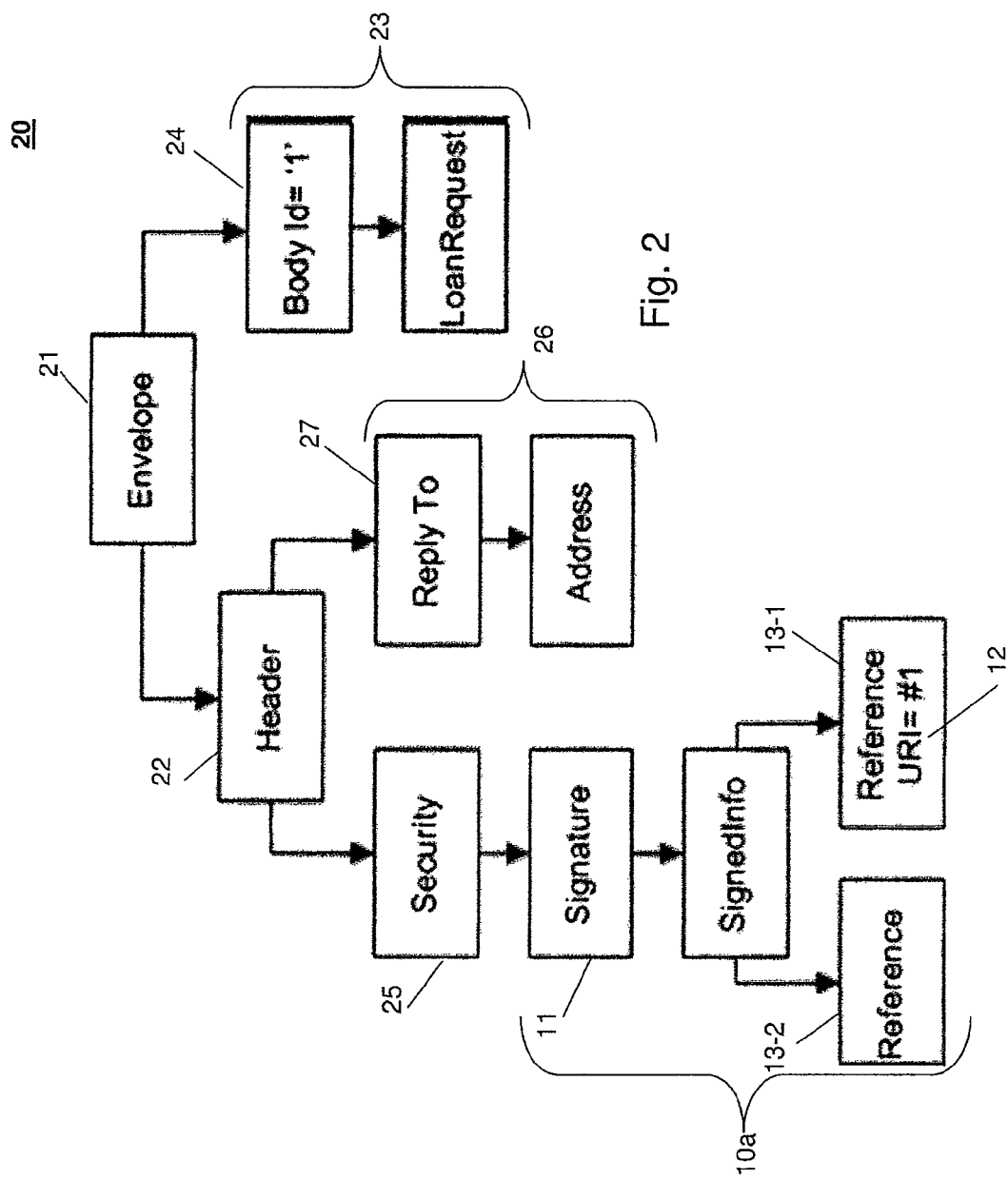
FIG. 2 shows an exemplary tree representation of a message comprising a signed sub-message.

FIG. 2 shows an exemplary message 20 (in particular, an XML-based message, and more particularly, a SOAP message) in its corresponding tree representation. The message 20 comprises an Envelope element 21, which represents the root of the tree representing the message 20. The Envelope element 21 comprises a Header element 22 and a Body element 24. A Header element 22 is optional in a SOAP message. The message 20 further comprises a signed sub-message, i.e. the Body sub-tree 23, which is signed by an XML signature 10a comprising a Signature element 11 and its child nodes 13-1, 13-2 located under a Security element 25 of the Header element 22 of the message 20. The XML signature 10a follows the XML Signature schema 10 shown in FIG. 1.

Figure 3:
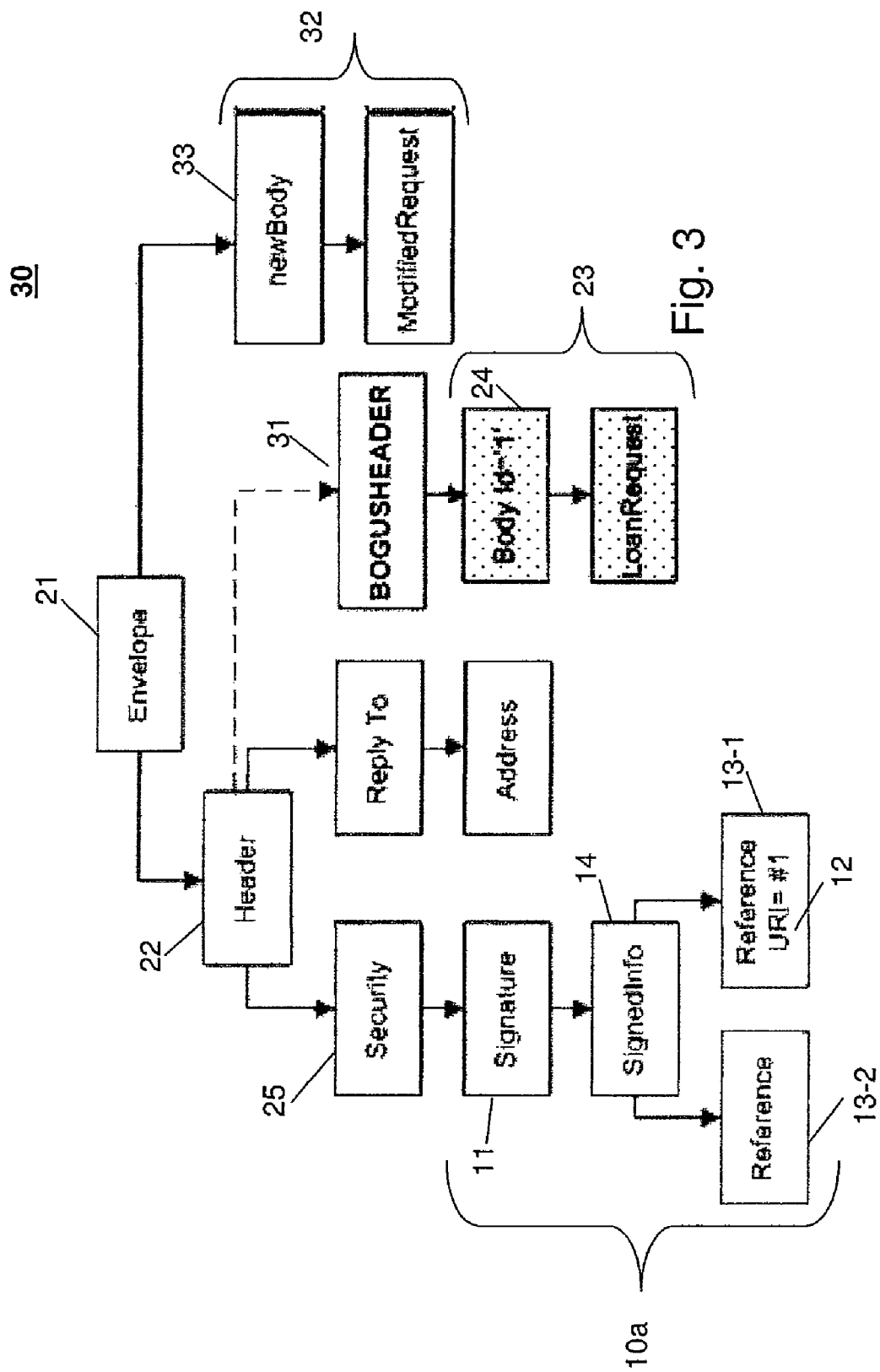
FIG. 3 shows an example of a rewriting attack on the message shown in FIG. 2, wherein a replay attack is performed.

FIG. 3 shows an example of a replay attack message 30 on the message 20 of FIG. 2. The Body sub-tree 23 of the message 20 is wrapped into a Bogus-header element 31 by an attacker. The Bogus-header element 31 makes the Body sub-tree 23 meaningless for a receiver of the message 30. Furthermore, the attacker creates a new Body sub-tree 32 comprising a new element newBody 33. According to the SOAP specification, the newBody element 33 is not required to have an identifier ID. Although the original message 20 is attacked and/or was compromised and made invalid due to the modified Body sub-tree 32 incorporated by the attacker, the XML signature 10a remains valid. The XML signature 10a is valid, because a reference URI 12 of the reference element 13-1 referencing an element having identifier ID=1 is still present in the modified message 30, and not changed. In other words, the Body element 24 having identifier ID=1 is, although relocated, still comprised in the message 30 and referenced by the URI 12 of the reference element 13-1. in other words, the Body sub-tree 23 of the original message 20 was relocated using the Bogus-header element 31. Since the signature 10a references in the URI 12 of the reference element 13-1 the Body element 24 of the Body sub-tree 23, the signature 10a is still valid although a newBody sub-tree 32 comprising a modified request is incorporated into the message 30. Consequently, the original message 20 was attacked and/or was compromised by fraudulent evasion of the XML signature 10a using a replay attack message 30.

Figure 4:
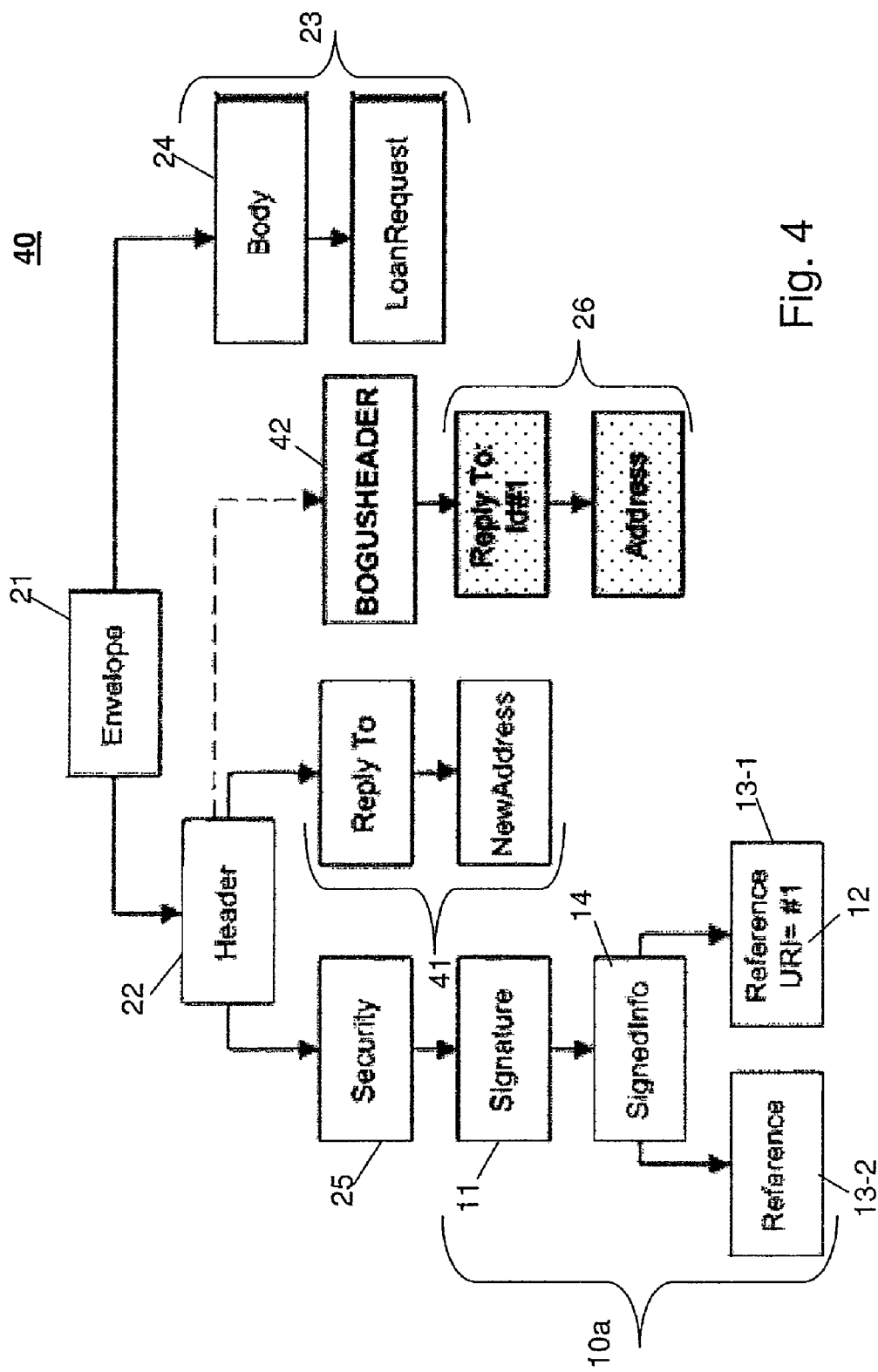
FIG. 4 shows an example of a rewriting attack on the message shown in FIG. 2, wherein a redirection attack is performed.

FIG. 4 shows an example of a redirection attack message 40 on a message. The message is similar to the message 20 of FIG. 2, however in this example a ReplyTo sub-tree 26 is signed instead of the Body sub-tree 23. The ReplyTo sub-tree 26 of the original message 20 is modified by an attacker to a new ReplyTo sub-tree 41 comprising a new Address element. Furthermore, the ReplyTo sub-tree 26 is relocated under a Bogus-header element 42. Sending the message 40 to a receiver, the receiver processes the message 40 and verifies the XML signature 10a. The XML signature 10a is still valid although the message 40 was attacked and/or was compromised. The XML signature 10a is still valid because the element referenced in the URI 12 of the reference element 13-1 (i.e. the ReplyTo element 27), although relocated in the message 30, still exists and is valid. Due to the attack, a response of the receiver is then sent to the new address comprised in the new ReplyTo sub-tree 41.

In general, to reduce the possibility of mounting a replay attack and/or a redirection attack on a message comprising a signed sub-tree (e.g. signed using XML Signature), it is possible to add a timestamp element to the message. A timestamp element may be used by a server, which handles messages, to manage its cache. In one exemplary aspect, the server may delete a message when a timestamp of said message expires. Besides, the SOAP specification allows more than one security element to co-exist within a message. According to the SOAP specification, two security elements can not have the same role attribute value.

Figure 5:
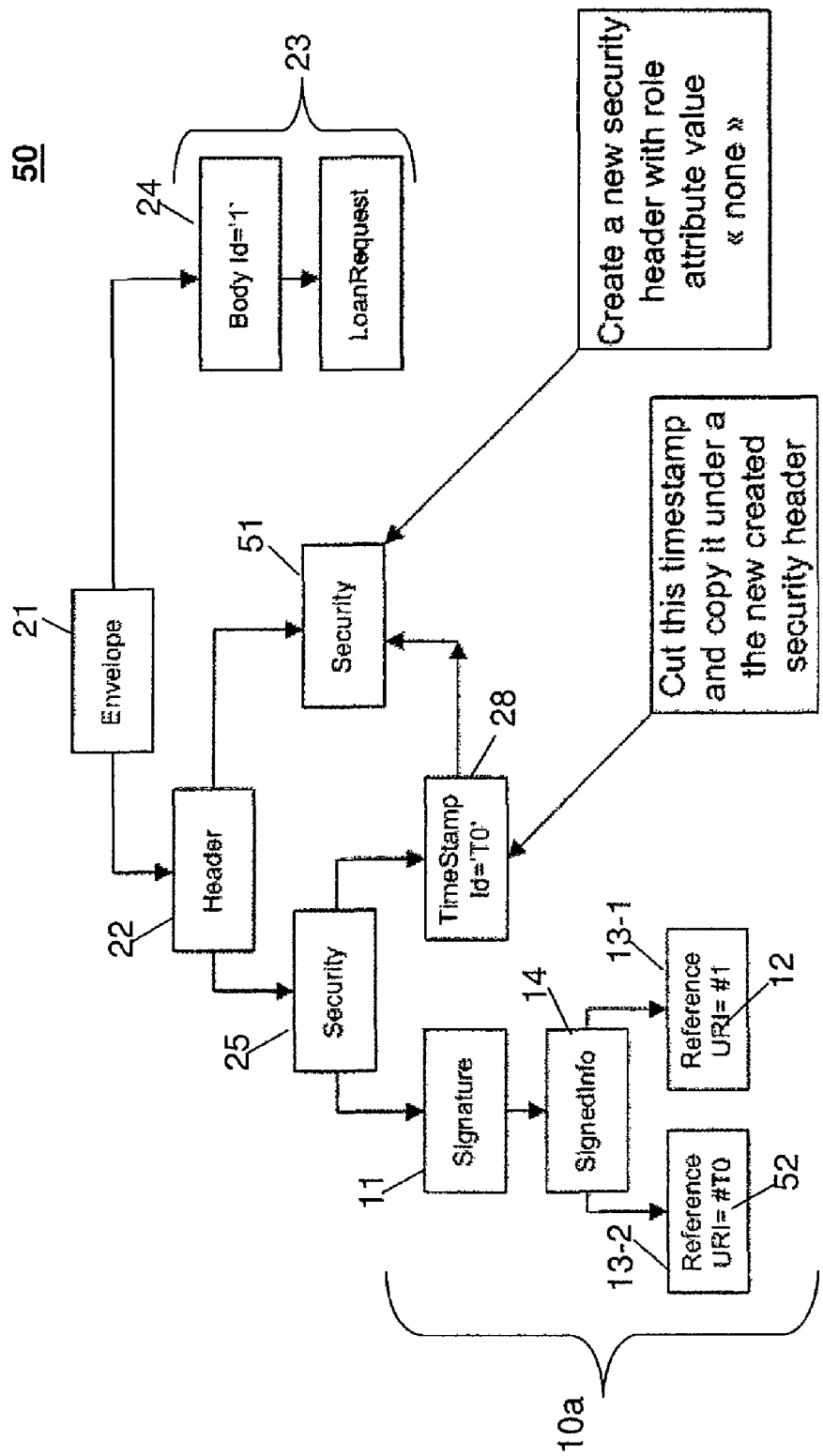
FIG. 5 shows an example of a rewriting attack on a message, wherein a multi security header attack is performed.

FIG. 5 shows an example of a multiple security Header attack message 50 on a message. When compared to the message 20 shown in FIG. 2, the method 50 additionally comprises a TimeStamp element 28 located under a Security element 25.

An attacker may create a further Security element 51 in addition to the Security element 25 of the original message. The further Security element 51 may comprise a role attribute having value none and a mustUnderstand attribute having value false. By specifying that the role attribute has value none, the further Security element 51 will not be processed by intermediaries of services when communicating the message 50. By specifying that the mustUnderstand attribute has value false, the intermediaries should not generate an error message. After having created the further Security element 51, the attacker cuts the old value of the TimeStamp element 28 under the further Security element 51 and adds a new timestamp value for the TimeStamp element 28. By performing such an attack comprising multiple security elements, an attacker may fraudulently evade the TimeStamp control of SOAP and the message 50 together with its XML signature 10a remains valid.

The possible rewriting attacks on a message described with reference to FIGS. 2 to 5 above may be performed due to the fact that an XML signature may be formally described by a context-free digital signature.

In the following, an exemplary formal definition of XML signatures in terms of context-free signatures is introduced in order to subsequently differentiate XML signatures from other signatures which are not context-free and which are therefore at least not prone to the rewriting attacks as identified above with reference to FIGS. 2 to 5. Two kinds of signatures will be introduced. The first kind is referred to as a context-sensitive signature and the second kind is referred to as an adaptive context-sensitive signature.

An XML signature is a digital signature. In one exemplary aspect, public key signatures are considered with regard to XML signatures in SOAP messages. XML signatures in SOAP messages are limited to public key-based digital signatures. In public key cryptography, each participant has a pair of conjugate keys: a secret key and a public key. The secret key shall only be known to the user concerned and the public key is public to any other user. Using a public-key based digital signature algorithm, a message is encrypted with the secret key of a user and can be decrypted by any other user with the conjugate public key.

A context-free signature as specified by an XML signature may be formally defined as follows:

Definition 1. A Context-Free Signature (CFS) is a digital signature, defined as a 2-tuple <S,M>, where S=$\{\delta_M\}_{s_A}$, $\delta_M$=h (M) be the digest of the message M, h( ) is a one-way hash function, $\{\delta_M\}_{s_A}$ means $\delta_M$ is encrypted with the secret key $s_A$ of user A, which can only be decrypted with its conjugate public key $p_A$.

According to Definition 1, a context-free signature (e.g. an XML signature) relates to a pair comprising a signature S and a message M signed by the signature S. The signature S is computed as follows: Firstly, applying a publically available one-way hash function h( ) (e.g. a cryptographic one-way-hash function such as SHA and/or MD5) to the message M. Said computation results in a digest (or a hash value) $\delta_M$ of the message M. Secondly, applying a secret key $s_A$ of a user A to the digest $\delta_M$.

In the following { } is also used to denote decryption of a digital signature.

In order to verify that a message M is signed by a user A using a context-free signature <S,M>, the following computational operations are performed.

In a first operation, the signature S is decrypted using the conjugate public key $p_A$ of user A. This may be formally expressed by $\{\{\delta_M\}_{s_A}\}_{p_A}$. From said computation it can be followed that there exists a message M' which is signed by a user A. However, it is not known at this operation whether the message M' equals the message M originally signed by the user A.

In a second operation, a digest is computed from the message M' received with the signature S using the publically available one-way hash function ho. This computation results in a digest $\delta'_M$. In case $\delta'_M = \delta_M$, the message M' equals the message M originally signed by user A, because h( ) is a one-way hash function. Consequently, in this case, the message M' is the message M originally signed by user A. Otherwise (e.g. the signature S can not be decrypted using the public key $p_A$ of user A, and/or the digest computed from the received message M' is different from the digest as obtained from the decrypted signature S), the message M originally sent by the user A was attacked and/or was compromised.

In a context-free signature <S,M>, the signature S and the message M signed by the signature S are loosely coupled. In particular, the signature S of the message M is encrypted with a secret key $s_A$ of a user A to sign the message M. Said encryption (substantially) is the only logical relationship between the signature S of user A and the message M signed by the user A. Said weakness of context-free signatures may become particularly evident in case a signed message M relates to a sub-message of a message $M_T$. In particular, an advantage of using a 2-tuple context-free signature <S,M> as a digital signature for signing messages may be to avoid resource intensive encryption of the message $M_T$ comprising the signed message M. Instead of the message $M_T$, only a digest $\delta_M$ of the message M is encrypted. Hence, strengths of context-free signatures (e.g. XML signatures) may be strong proof of origin and computational efficiency. However, weakness of context-free signatures may be said loose coupling between the signature S and the message M being signed. Consequently, security attacks may exploit said weakness, wherein rewriting attacks such as those described above with reference to FIGS. 2 to 5 may be one of them.

In order to secure a message $M_T$, wherein at least a sub-message M is signed by a signature S, from rewriting attacks, a context-sensitive signature is defined. In a context-sensitive signature, not only a message M to be signed and the corresponding signature S, but also a context of the message M are incorporated into the context-sensitive signature and sent. A context may refer to the whole message $M_T$, comprising the message M at the time of signing the message M. In particular, the context of the signed message M may be the tree representation of the message $M_T$ itself at the time of signing the message M. More particularly, the context of the signed message M may be a unique path to the message M through the tree representation of the message $M_T$, at the time of signing the message M. For example, the message 20 having the tree representation shown in FIG. 2 defines the context of the signed Body sub-tree 23 at a point in time by a unique path from the Envelope element 21 to the Body element 24.

In other words, a context of a message M incorporated into a context-sensitive signature relates to the state of the (dynamic) context at the time of signing the message M. A context may be dynamic since it may evolve over time. Therefore, a temporal parameter (e.g. a time stamp) is also comprised in a context-sensitive signature. Context-free signatures do not require incorporation of a time stamp for a signed message M determining the time of signing the message M.

A context of a message M may be formally defined as follows:

Definition 2. The context $C_M^t$ of message M, at time t is the state of the surroundings of M. The context defines the position or the coordinate of a message and the message derives its semantics from the context. A mapping of M to G is one-to-one and onto.

A mapping is one-to-one if, whenever for two distinct elements of the domain, their images are distinct elements of the codomain. So a mapping f:S→T is one-to-one if $f(s_1)=f(s_2)$ implies $s_1=s_2$.

A mapping is onto, if every element of the codomain is the image under the mapping of at least one element of the domain. So a mapping f:S→T is onto if the image (or range) of f(S) is the whole of T.

A mapping from a message M to its context $C_M^t$ is one-to-one and onto. Therefore, by definition 2, the context $C_M^t$ of a message M is unique. For example, in the message 20 shown in FIG. 2, the context of the Body sub-tree 23 may be the structure of the tree representing the message 20 at the time of signing the Body sub-tree 23 and a derivation of the Body sub-tree 23 from the message 20. The derivation may be specified by an unambiguous and unique path from the root 21 of the message 20 to the Body sub-tree 23. So a context of a message M is a state of the growing tree surrounding the sub-tree representing the message M at a particular time. The context may be therefore defined by ancestors, siblings and the relatives thereof.

An element of a message represented as a tree or a sub-tree is representable as a node of the tree or the sub-tree. For example, the Body element 24 of the tree representing the message 20 in FIG. 2 is a node of said tree and the root of the sub-tree representing the Body sub-tree 23. A composition of a node of a tree may be specified by a regular expression. A tree or a sub-tree representation of a message may be specified by a regular tree grammar. Examples of formal definitions for a regular tree grammar and for a regular expression are given in the following:

Definition 3. A Regular Tree Grammar (RTG) is a 4-tuple G=(N, T, S, P), where N is a finite set of non-terminals, T is a finite set of terminals, S is the start symbol, S ∈ N, P is the set of production rules of the form X←aR, where X∈N, a∈T, and R is a regular expression over N; X is the left-hand side, aR is the right-hand side, and R is called the content model of this production rule and it is a regular expression.

A regular tree grammar defines a set of trees having a structure as defined by said grammar. Furthermore, a regular tree grammar defines a regular tree language. So those trees conforming to a given regular tree grammar form the regular tree language specified by said regular tree grammar. A regular tree grammar defines a syntactic restriction with regard to other (in particular context-sensitive) tree grammars in that every recursive use of a non-terminal X which is not guarded (behind a label) need to be in sequence. An example of a regular tree grammar may be Relax NG for XML-based data.

For example, the following production rules according to a regular tree grammar conforming to definition 3 may define the tree representation of the message 20 shown in FIG. 2:

Envelope←(Header, Body)
Body←(LoadRequest)
Header←(Security, ReplyTo)
ReplayTo←(Address)
Security←(Signature)
Signature←(SignedInfo)
SignedInfo←(Reference, Reference)

Definition 4. A Regular Expression (RE) R is defined as follows:
∀ω∈T is a RE.
(R) is a RE, ( ) is group operator.
(R1,R2) is a RE, where R1, R2 are REs, R1 and R2 are in order. ',' is order operator.
(R1|R2) is a RE, where R1, R2 are REs and '|' is or operator.
R[0,*] is a RE, R may occur 0 or more times.
R[1,*] is a RE, R may occur 1 or more times.
R[n] is a RE, R must occur exactly n times.

According to definition 4, an empty string λ is a regular expression. In a regular expression R[m,n] if m>n, then R[m,n]=λ and if m=n, then RP[m,m]=R[m]. A regular tree language L specified by (x,y) is L(x,y)=(x,y), an ordered set. A regular tree language L specified by (x|y) is L(x|y)={x,y}, an unordered set.

Having defined a regular tree grammar and regular expressions usable within the regular tree grammar, a formal context of a message M at a time t may be defined as follows:

Definition 5. A formal context is a 2-tuple $<SC_M^t, C_M^t>$ of a tree at time t, where $C_M^t$ is the message context and $SC_M^t$ is the corresponding security context.

Definition 6. A message context $C_M^t$ of a marked node [M]∈N of a tree at a particular time is defined by a set of well-formed productions of the RTG which are required during derivation of the marked node [M].

Definition 7. For each marked element node [M]∈N of a tree there exists a corresponding marked node [B]∈N. The security context $SC_M^t$ at a time t is defined by a set of well-formed productions of the RTG which are required during the derivation of the marked node [B].

It should be understood that the term "context" or "well-formed context" relates to a message context of a message M, i.e. a message context being comprised in a formal context, wherein the formal context comprises the message context and a security context.

Both a context $C_M^t$ of a message M and a security context SCM of the message are said to be well-formed, if the following conditions are satisfied on a tree representation of a message $M_T$ comprising the message M being representable as a sub-tree of the message $M_T$:

A partial grammar formed by a set of production rules is unambiguous.

For all production rules of a formal context, a regular expression R, X←aR can have only an absolute occurrence indicator having the form R[n]. No occurrence indicator implies n=1.

A node M, of a tree, to be signed, is to be marked as [M] in the R of a corresponding production rule where it appears. Marked node [M] can occur exactly once (i.e. n=1) and said marked node appears in one and only one production rule and said production rule is the one which is used in the last operation of a derivation path of the node M in the tree.

If a derivation path of a node in a tree comprises a node Y; Y ∈ N which is the $i^t$ occurrence of Y[n],n>1 in R, then Y[n] is replaced by an equivalent regular expression Y[1,i−1],Y,Y[i+1,n].

Requiring that a well-formed context G is definable by an unambiguous set of production rules and therefore by an unambiguous grammar, the context $C_M^t$ may ensure that there exists one and only one derivation tree, i.e. a tree which is derivable from a set of production rules. Requiring that an occurrence indicator n=1 for all non-terminals of a tree or of a sub-tree (e.g. nodes which are not leafs) occurring in a derivation path through the tree to a marked node [M] may ensure that there exists only one (exactly one) derivation path to [M] in the tree. Requiring replacement of a regular expression comprising multiple occurrences of a node by an equivalent regular expression, specifies explicitly which of the multiple occurrences of the node is used in a derivation, and segregates it out. In this way, the derivation path to the node [M] in accordance with a well-formed context becomes unambiguous and deterministic. Remaining siblings of the segregated node are then part of a context of the node. Therefore, a unique derivation path to a node [M] through the tree exists.

In other words, a context may be well-formed if the context at least comprises one or more production rules which can be used to unambiguously derive a path from the root of a tree representation of a message to an element comprised in the message. Hence, a context of a message may be well-formed if the context is usable to derive a unique and unambiguous derivation path through the message.

A context-sensitive signature comprising a signature S, a message M being signed by the signature S, and a well-formed context $C_M^t$ may be formally defined as follows:

Definition 8. A Context-Sensitive Signature (CSS) is a digital signature, defined as a 3-tuple $<S,M,C_M^t>$, where $S=\{\delta_M,\delta_C,t\}_{s_A}$, $\delta_M$=h(M) be the digest of message M, $C_M^t$ is the context of M at time t, $\delta_C$=h($C_M^t$), h( ) is a one-way hash function, t is the time of signing the message.

According to definition 8, a context-sensitive signature relates to a 3-tuple comprising a signature S, a message M signed by the signature S, and a well-formed context $C_M^t$. The signature S is computed as follows: Firstly, applying a publically available one-way hash function h( ) to the message M. Said computation results in a digest (i.e. a hash value) $\delta_M$ of the message M. Secondly, computing a well-formed context $C_M^t$ for the message M at the time t of signing the message M. The context $C_M^t$ is computed by deriving a path through the whole message $M_T$ comprising the message M to a marked node [M] according to one or more well-formed production rules of a regular tree grammar. The regular tree grammar is usable to derive the tree representation of the message $M_T$. Said path is referred to as a derivation path. The marked node [M] may represent the root of the sub-tree representation of the message M. The tree representation of the message $M_T$ comprises said sub-tree. The derivation path is uniquely defined by one or more unambiguous and well-formed production rules of the regular tree grammar. Thirdly, applying the hash function h( ) to the context $C_M^t$. Said computation results in a digest $\delta_C$ of the context $C_M^t$. Finally, applying a secret key $S_A$ of a user A to the digests $\delta_M$ and $\delta_C$.

A user receiving (i.e. a receiver) the message $M_T$ together with its context-sensitive signature $<S,M,C_M^t>$ from a user A may verify that the message M in the context $C_M^t$ is signed by the user A at time t by performing the following computation operations:

In a first operation, the signature S is decrypted by applying a conjugate public key $p_A$ of the user A to the signature S. This may be formally expressed by $\{\{\delta_M,\delta_C,t\}_{s_A}\}_{p_A}$. If the key pair of user A is valid, the receiver obtains the digests $\delta_M$ and $\delta_C$, and the time t, denoting when the message M has been signed by user A. The key pair may comprise the secret key $s_A$ and the conjugate public key $p_A$ of the user A. After having performed this operation, the receiver knows that there exists a message M' which is in a context C' and which is signed by the user A. However, it is not known whether the message M' equals the message M originally signed by the user A and whether the context C' is the context $C_M^t$ associated with the message M.

In a second operation, a new digest is computed from the received message M' using the publically available one-way hash function h( ). This computation results in a digest $\delta'_M$. In case $\delta'_M=\delta_M$, the message M' equals the message M originally signed by user A, because h( ) is a one-way hash function. Consequently, in this case, the received message M' is the message M originally signed by the user A. Otherwise (e.g. the signature S can not be decrypted using the public key $p_A$ of the user A, and/or the digest computed from the received message M' is different from the digest as obtained from the decrypted signature S), the message M originally sent from by the user A was attacked and/or was compromised. However, it is not known yet whether the message M' is the one associated with the context $C_M^t$ signed by the user A at the time t.

In a third operation, a new context C' is generated from the message M'. The context C' is computed by generating a derivation path through the message $M_T$ to the marked node [M]. The derivation path is computed by executing the one or more well-formed and unambiguous production rules of the context $C_M^t$ to the node [M], where [M] being marked in one of the one or more production rules. Then a new digest $\delta_{C'}$ is computed from the context C' by applying the hash function h( ) to the newly computed context C'.

If the new digest $\delta_{C'}$, equals the digest $\delta_C$ of the context $C_M^t$, it is verified that the message M' is the message M associated with the context $C_M^t$ which is signed by the user A at the time t. Otherwise, the message M' under verification is not in the derivation path to the node [M] through the message $M_T$ and therefore out of the context $C_M^t$. This can be unambiguously verified since the derivation path is unique according to the definition of a well-formed context.

According to a context-sensitive signature $<S,M,C_M^t>$, a signature S is closely associated with the context G in which the message M is signed. Therefore, a context-sensitive signature $<S,M,C_M^t>$ may be used to prevent fraudulent attacks, in particular rewriting attacks, on messages exchanged in a distributed environment such as the Internet. However, in case a signed message M may be allowed to migrate from its original context $C_M^t$ without losing its validity, a context sensitive signature $<S,M,C_M^t>$ may not be sufficient to prevent fraudulent attacks on the signed message M. Said message M may be referred to as a migratory signed message M. In case of a migratory signed message M it may be necessary that the signed message M is taken out from the original message $M_T$ and added in another message and thus generate a new message $M_{T2}$ wherein the message M has a new context $C_M^{tc}$. In such an exemplary case, the signed message M may become an orphan losing its original context $C_M^t$ and being adopted in a new context $C_M^{tc}$. In one exemplary implementation using SOAP for communicating messages between web services, migratory signed messages may often be used.

In one exemplary aspect, a client may request a travel agent for an itinerary by sending a SOAP message to the travel agent web service. The travel agent web service may collect one or more price offers from one or more partner airline web services. The one or more price offers may be signed by the corresponding one or more partner airline web services. Having selected the one or more signed price offers, the travel agent web service may take out the signed offers from the corresponding SOAP messages received from the one or more partner airline web services and may compose a new SOAP message comprising the one or more price offers signed by the partner airline web service and may send the new SOAP message to the client. In this way, the new SOAP message becomes a migratory signed message comprising the one or more price offers being signed in one or more different original contexts.

Therefore, in such a migratory signed message, the one or more comprised signed messages (in the above example: the one or more price offers) need to be valid in the migratory signed message having another context. A context-sensitive signature may be adapted to fulfill said requirement. Such a signature is referred to as an adaptive context-sensitive signature being a modification of a context sensitive signature $<S,M,C_M^t>$. The modification basically relates to a sequential (or twin) signature instead of a single signature. An adaptive context-sensitive signature may be formally defined as follows:

Definition 9. An Adaptive Context-Sensitive Signature (ACSS) is a digital signature, defined as a 4-tuple $<S_M,S_C,M,C_M^{tc}>$, where $S_M=\{\delta_M,t_M\}_{s_A}$, $S_C=\{\delta_C,t_C\}_{s_B}$, $\delta_M=h(M)$ be the digest of message M, $C_M^{tc}$ is the context of M at time $t_C$, $\delta_C=h(C_M^{tc})$, h( ) is a one-way hash function, $t_M$ is the time of signing the message M, $t_C$ is the time of signing the context $C_M^{tc}$.

According to definition 9, an adaptive context-sensitive signature $<S_M,S_C,M,C_M^{tc}>$ relates to a 4-tuple comprising a signature $S_M$, a signature $S_C$, a message M signed by the signature $S_M$, and a well-formed context $C_M^{tc}$, signed by the signature $S_C$. The signature $S_M$ is generated by signing the message M using a secret key $s_A$ of a user A at time $t_M$ in an originally context $C_M^t$. The message M is then migrated into a new context $C_M^{tc}$ by a user B. Before generating the signature $S_C$ of the new context $C_M^{tc}$, the user B may verify the original context $C_M^t$ of the signed message M. The signature $S_S$ is generated by signing the new context $C_M^{tc}$ using a secret key $s_B$ of the user B. A user C may then receive a message $M_T$ from user B comprising the adaptive context sensitive signature $<S_M,S_C,M,C_M^{tc}>$, said signature comprising the signature $S_M$ for the migratory signed message M, the signature $S_C$ of the new context $C_M^{tc}$, the original message M, and the new context $C_M^{tc}$. Here, the migratory message M is signed by an originator A and the context $C_M^{tc}$, is signed by another user B, not necessarily user A. The new context $C_M^{tc}$ describes a new context of message M after having migrated the signed message M from its original context $C_M^t$.

A user C receiving the message $M_T$ comprising the adaptive context-sensitive signature $<S_M,S_C,M,C_M^{tc}>$ may verify that the message M in the context $C_M^{tc}$ is originally signed by user A at time $t_M$ and that the context $C_M^{tc}$ is signed by user B at time $t_C$. Basically, said verification is similar to a verification of a context-sensitive message. A verification of an adaptive context-sensitive signature may comprise the following operations:

In a first operation, the signatures $S_M$ and $S_C$ are decrypted using the conjugate public keys $p_A$ and $p_B$ of users A and B respectively, to obtain digests $\delta_M$, and $\delta_C$. At this operation, it is known that there exists a message M' being signed by a user A and a context C' being signed by a user B. However, at this operation it is not known whether the message M' is the message M originally signed by user A and whether the context C' is the context associated with the message M.

In a second operation, a new digest is computed from the received message M' using the publically available one-way hash function h( ). This computation results in a digest $\delta'_M$. In case $\delta'_M=\delta_M$, the message M' equals the message M originally signed by the user A, because h( ) is a one-way hash function. Consequently, in this case, the received message M' is the message M originally signed by user A. Otherwise (e.g. the signature S can not be decrypted using the public key $p_A$ of the user A, and/or the digest computed from the received message M' is different from the digest as obtained from the decrypted signature S), the message M sent from the user A was attacked and/or was compromised. However, it is not known yet whether said message M' is the one associated with the context $C_M^{tc}$ being signed by the user B at the time $t_C$.

In a third operation, a new context C' is generated from the message M' at the time $t_C$. The context C' is computed by generating a derivation path through the message $M_T$ to the marked node [M]. Then a new digest $\delta_C$ is computed from the context C' by applying the hash function h( ) to the newly computed context C'. If the new digest $\delta_{C'}$ equals the digest $\delta_C$ of the context $C_M^{tc}$, it is verified that the message M' is the message associated with the context $C_M^{tc}$ which is signed by the user B at the time $t_C$. Otherwise, the message M' under verification is not in the derivation path to the marked node [M] through the message $M_T$, and therefore out of the context $C_M^{tc}$. The derivation path is unique according to the definition of a well-formed context.

An advantage of said modified version of a context-sensitive signature may relate to the aspect that a proof of origin, a content integrity of the signed message M, and a content integrity of the context $C_M^{tc}$ are decoupled. As a result, the signed message M can freely migrate from context to context (e.g. by copying the message M in different messages $M_{Ti}$) without losing the necessary semantics of a currently valid context used to prevent rewriting attacks.

Figure 6:
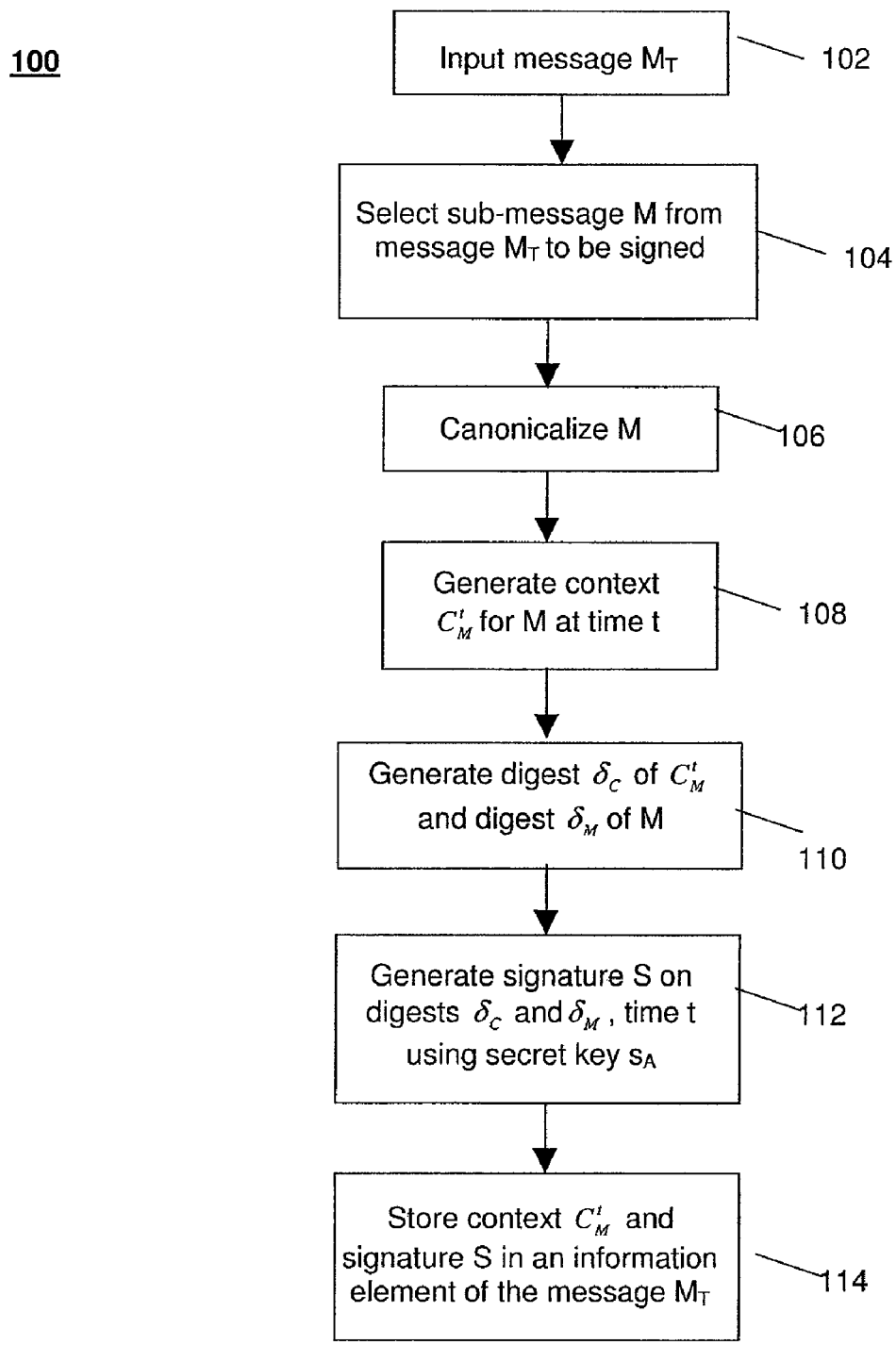
FIG. 6 shows an exemplary implementation of a method for generating a digital signature for an electronic message.
Figure 7:
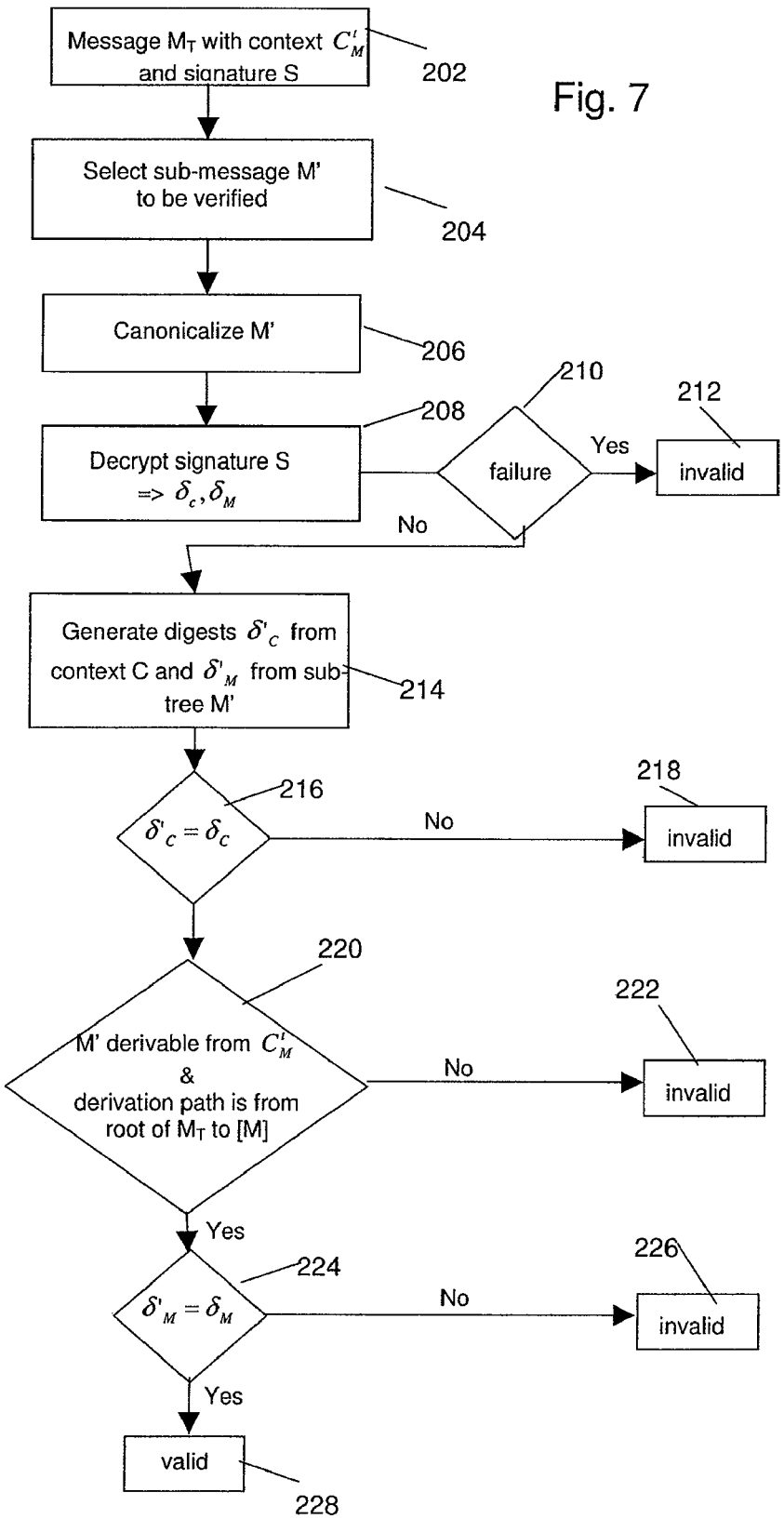
FIG. 7 shows an exemplary implementation of a method for verifying a digital signature of an electronic message.

It should be understood that the above given definitions and explanations also hold for the following text with reference to FIGS. 6 and 7. In particular, it should be understood that a context refers to a well-formed context according to the above given definitions and explanations. Furthermore, the methods shown in FIGS. 6 and 7 can be easily extended to enable generation and verification of adaptive context-sensitive signatures by incorporating the above specified method operations. Additionally, each of the method operations shown with reference to FIGS. 6 and 7 is optional.

FIG. 6 shows an example of a computer-implemented method 100 for automatically generating a digital context-sensitive signature $<S,M,C_M^t>$ for a message M. The message M being comprised in an electronic message $M_T$ communicated between components (e.g. web services) in a distributed computing environment.

At 102, a user A generates a message $M_T$, which can be sent to other users over a network. The message $M_T$ is representable as a tree. At 104, at least one message M to be signed is selected from the message $M_T$. The message M is representable as a sub-tree of the tree representing the message $M_T$. At 106, the message M is canonicalized by converting the message M into a possibly pre-defined canonical form. At 108, a context $C_M^t$ for the message M at time t is generated. The context $C_M^t$ is computed by generating one or more production rules of a regular tree grammar. The regular tree grammar is usable to derive the tree representation of the message $M_T$. The one or more production rules are unambiguously and well-formed such that message M is unambiguously derivable in the message $M_T$. In other words, the one or more production rules are usable to generate a unique derivation path through the tree representation of the message $M_T$ to the sub-tree representation of the message M. An element of the message M may be selected and specified for the one or more production rules. The element is representable as a node of the sub-tree. Said selected node of the sub-tree is segregated and marked [M] in a production rule of the one or more production rules in which the node [M] appears. In one exemplary aspect, the node [M] may be the root of the sub-tree. Furthermore, a security context $SC_M^t$ for the message M may be generated. The security context $SC_M^t$ may be specified by one or more unambiguous and well-formed production rules usable to generate a unique derivation path to a corresponding node of the marked node [M]. The corresponding node may be marked [B] in the one or more production rules. The corresponding marked node [B] may represent a reference element of the message $M_T$ referencing the marked element [M]. At 110, a context digest $\delta_C$ is generated from the context $C_M^t$ and a message digest $\delta_M$ is generated from the message M. Digests $\delta_C$ and $\delta_M$ are computed by applying a publicly available one-way hash function h( ) to the context $C_M^t$ and the message M, respectively. Examples of hash functions which may be used in the method 100 may be MD4, MD5, RIPEMD-128, RIPEMD-160, and/or SHA. At 112, a signature S for the message M is generated. This is done by applying a secret key $s_A$ of the user A to the digests $\delta_C$ and $\delta_M$. Finally, at 114, the signature S and its context $C_M^t$ are stored in an information element of the message $M_T$, which can be sent to another user. Furthermore, the security context $SC_M^t$ may be also stored in the information element.

FIG. 7 shows an example of a computer-implemented method 200 for automatically verifying a digital context-sensitive signature <S,M,$C_M^t$> for a message M. The message M being comprised in an electronic message $M_T$ communicated between components (e.g. web services) in a distributed computing environment. At 202, a user B receives the message $M_T$ comprising the context $C_M^t$ and the signature S from the user A. At 204, a message M' is selected from the message $M_T$, which is to be verified. Selection of the message M' may be performed by generating a derivation path to a signed corresponding marked node [B] from a security context $SC_M^t$ associated with the context $C_M^t$. The corresponding marked node [B] may reference a marked node [M] in the message $M_T$. The marked node [M] may represent the root of the sub-tree representation of the selected message M'. At 206, the message M' is canonicalized by converting the message M into a possibly pre-defined canonical form. At 208, the signature S is decrypted by a conjugate public key $p_A$ of user A. If the decryption fails (210), then (212) an invalidity warning is returned denoting that the signature S is invalid and the method 200 is stopped. Otherwise, if the signature S is valid, digests $\delta_C$ and $\delta_M$ of the context $C_M^t$ and the message M are computed. Now, the user B knows that there exists a message M' which is in a context C' signed by the user A. However, it is not yet verified whether the message M' equals the message M originally signed by the user A and whether the context C' is the context $C_M^t$ associated with the message M. In other words, it is not yet verified whether the message M' is in the original context $C_M^t$. At 214, a new context digest $\delta'_C$ is generated from the context $C_M^t$ received with the message $M_T$ and a new message digest $\delta'_M$ is generated from the signed message M'. At 216, it is checked whether the new context digest $\delta'_C$ equals the context digest $\delta_C$ signed by user A. If said two digests are not equal, then (218) an invalidity warning is returned denoting that the context is tempered (or invalid) and the method 200 is stopped. Otherwise, the context C' equals the context $C_M^t$ originally signed by user A, because h( ) is a one-way hash function. Thus, it is verified that the received context C' is the context $C_M^t$ originally signed by user A. However, it is not yet known whether the message M' is the one associated with the context $C_M^t$ signed by the user A at the time t. At 220, it is checked whether the message M' is derivable from the context $C_M^t$ and whether a computed derivation path is from the root of the tree representation of the message $M_T$ to the marked node [M]. The one or more production rules comprised in the context $C_M^t$ are used to generate a unique derivation path to the marked node [M]. If the received message M' is not located on the computed derivation path, it is unambiguously determined that message M' is out of the context $C_M^t$, and a (successful) rewriting attack on the message $M_T$ occurred. In this case, an invalidity warning is returned denoting a (successful) rewriting attack on the message $M_T$ and the method 200 is stopped (222). Otherwise, the message M' is in the original context $C_M^t$. It remains to verify that the received message M' equals the message M originally signed by the user A. At 224, it is checked whether the new message digest $\delta'_M$ equals the message digest $\delta_M$. If said two digest are not equal, the content of the message M was modified and/or tempered such that an invalidity warning is returned and the method 200 is stopped (228). Otherwise (228), it is verified that the message M' is in the context $C_M$ and is signed by the user A at time t.

In the following exemplary contexts of the example messages 20, 30, 40, 50 shown with reference to FIGS. 2 to 5 are generated and verified using the methods 100, and 200 as shown in FIGS. 6 and 7.

With reference to FIG. 2, the message 20 comprises a signed message Body 23 which is signed by a user A at time t. The context of the message Body 23 comprises the following well-formed production rule of a regular tree grammar usable to derive the tree representation of the message 20 at time t:

Envelope←(Header; [Body]), wherein [Body] 24 relates to the marked node of the message Body 23 being signed.

A corresponding security context may be defined by the following well-formed production rules:

Envelope←(Header, Body)
Header←(Security,ReplyTo)
Security←(Signature)
Signature←(SignatureInfo)
SignatureInfo←(Reference,[Reference]), wherein [Reference] 13-1 is the corresponding element of the marked node [Body] 24.

The message 20 is sent to another user, wherein the message 20 is attacked using a replay attack such that the receiver receives an attacked (or compromised) message 30 as shown in FIG. 3. After receipt of the message 30, a verification method 200 according to FIG. 7 will be triggered. In operation 204, a message M' is selected with regards to the security context. Therefore, the message M' is selected with regard to the Reference element 13-1. Since the URI attribute 12 of the Reference element 13-1 references the Body element 24, the sub-tree having as its root the Body element 24 is chosen as M', i.e. the message Body 23. As shown in FIG. 3, the message Body 23 is relocated under the Bogus-header element 31. During verification of the signature, the operations 206, 208, 214, and 216 are executed successfully. At 220, the context of the message M' is verified. Using the context associated with the message Body 23 received with the message 30, a derivation path is generated from the root 21 of the original message 20 to the marked node [Body] 24 comprised in the context. The derivation path is generated by applying the production rules comprised in the context of the message. The derivation path generated from said context is:
Envelope=<[Body].

However, the message M' under verification is not in said derivation path, as it is now located under the Bogus-header 31 and hence not in the context of the originally sent message 20, such that a rewriting attack occurred and is detected. The verification of the signature for the message 30 thus failed.

With reference to FIG. 2, the message 20 comprises a message ReplyTo 26 which is signed by a user A at time t. The context of the signed message ReplyTo 26 comprises the following well-formed production rules of a regular tree grammar:
Envelope←(Header, Body),
Header←(Security, [ReplyTo])
wherein [ReplyTo] is the marked node of the message ReplyTo 26 being signed.

A corresponding security context may be defined by the following well-formed production rules:
Envelope←(Header,Body)
Header←(Security,ReplyTo)
Security←(Signature)
Signature←(SignatureInfo)
SignatureInfo←(Reference,[Reference])
wherein [Reference] 13-1 is the corresponding element of the marked node [ReplyTo].

The message 20 is sent to another user, wherein the message 20 is attacked by a redirection attack such that the receiver receives an attacked message 40 as shown in FIG. 4. After receipt of the message 40, a verification method 200 according to FIG. 7 will be triggered. In operation 204, a message M' is selected with regard to the corresponding marked node [Reference] 13-1 by generating a derivation path from the security context. Since the URI attribute of the Reference element 13-1 references the ReplyTo element, the sub-tree having as its root the ReplyTo element is chosen as M'. As shown in FIG. 4, the message ReplyTo 26 is relocated under the Bogus-header element 42. During verification of the signature, the operations 206, 208, 214, and 216 are executed successfully. At 220, the context of the message M' is verified. Using the stored context for the message ReplyTo 26 received with the message 40, a derivation path is generated from the root 21 of the original message 20 to the marked node [ReplyTo] comprised in the context by applying the comprised production rules. The derivation path generated is:
Envelope=>Header=>[ReplyTo].

However, the message M' under verification is not in said derivation path, as it is now located under the Bogus-header element 42 and hence not in the context of the originally sent message 20, such that a rewriting attack occurred and is detected. The verification of the signature for the message 40 thus failed.

With reference to FIG. 5, the message 50 comprises two signed messages, the body 23 and the TimeStamp 28. The context of the signed message Body 23 comprises the following well-formed production rule of a regular tree grammar:
Envelope←(Header,[Body]),
wherein [ReplyTo] 24 is the marked node of the message Body 23 being signed.

A corresponding security context may be defined by the following well-formed production rules:
Envelope←(Header,Body)
Header←(Security,ReplyTo)
Security←(Signature)
Signature←(SignatureInfo)
SignatureInfo←(Reference,[Reference])
wherein [Reference] 13-1 is the corresponding element of the marked node [Body] 24.

Similarly, a context of the TimeStamp message 28 is the defined by the following well-formed production rules:
Envelope←(Header,Body)
Header←(Security)
Security←(Signature,[TimeStamp]),
wherein [TimeStamp] 28 is the marked node of the message TimeStamp 28 being signed.

A corresponding security context of the TimeStamp message 28 may be defined by the following well-formed production rules:
Envelope←(Header,Body)
Header←(Security)
Security←(Signature,TimeStamp)
Signature←(SignedInfo)
SignedInfo ([Reference],Reference),
wherein [Reference] 13-2 is the corresponding element of the marked node [TimeStamp] 28.

The message 50 is sent to another user, wherein the message 50 is attacked using a multiple security header attack. The multi security header attack may be performed as described with reference to FIG. 5. After receipt of the (successfully) attacked message 50, a verification method 200 according to FIG. 7 will be triggered. The message Body 23 is verified in a way similar to the above given description with regard to the first kind of attack. Subsequently, the message TimeStamp 28 is verified. In operation 204, a message M' is selected with regards to the Reference element 13-2 by computing a derivation path from the associated security context. Since the URI attribute 52 of the Reference element 13-2 references the TimeStamp 28, the sub-tree having as its root the TimeStamp element 28 is chosen as M'. As explained with reference to FIG. 5, the TimeStamp element 28 is relocated under a newly created Security element 51 during the multi security header attack. During verification of the signature, the operations 206, 208, 214, and 216 are executed successfully. At 220, the context of the message M' is verified. Using the stored context for the TimeStamp 28 received with the attacked message 50, a derivation path is generated from the root 21 of the original message 20 to the marked node [TimeStamp] 28 comprised in the context. The derivation path generated is:
Envelope=>Header=>Security(1)=>[TimeStamp]

However, the message M' under verification is not in said derivation path, as it is now located under the new Security element 51 and hence not in the context of the originally sent message 50, such that a rewriting attack occurred and is detected. Such an attack can be detected since the production rules are unambiguous according to the above given definition of a well-formed context. In particular, for multiple occurrences of a node (in this case a security element) it is specified which of the multiple occurrences should be selected during a derivation. In this case, the production rules of the context specify that the first occurrence of a security element, i.e. the Security element 25, should be used during derivation. The verification of the signature for the attacked message 50 thus failed.

As described with reference to the FIGS. 1 to 7 as well as the above given examples, a formal approach which is based on formal language theory with regard to rewriting itself, and is not based on a data structure approach, and which is aware of all types of XML rewriting attacks on XML-based messages, is provided. Furthermore, said approach to XML rewriting attacks may easily be capable of being integrated with existing processors for XML-based messages, for example as an XML schema document. Additionally, the approach should reduce a computational complexity.

Furthermore, by signing a message while considering the context of the message, attacks on messages may be prevented. In particular, using a context-sensitive signature may provide countermeasures for all known forms of rewriting attacks.

Furthermore, context-sensitive signatures are usable with known standards such as XML-based messages, e.g. SOAP messages applicable for SOA-based web services. Context-sensitive signatures may not only rely on the structure of messages but also take into account aspects of possible attacks themselves. Consequently, secure message exchange and/or communication between distributed computing nodes in an unsecure network such as the Internet is improved.

Furthermore, by verifying not only that the message is signed by the owner but also that the received message is in the context at the time of signing the message provides a strong and secure countermeasure against different attacks, in particular against rewriting attacks.

Furthermore, by generating and signing a new context of a signed message that is migrated, an adaptive context-sensitive signature may be used to ensure security of the message although the originally signed sub-message is migrated and adopted in a new context. Accordingly, even in the case that the SOAP Extensibility specification is used to specify and communicate messages which can migrate from context to context via the Internet, a countermeasure to attacks, in particular to rewriting attacks may be provided. Said adaptive context-sensitive signatures thus enhance and improve the security of messages even if messages may migrate from context to context.

Figure 8:
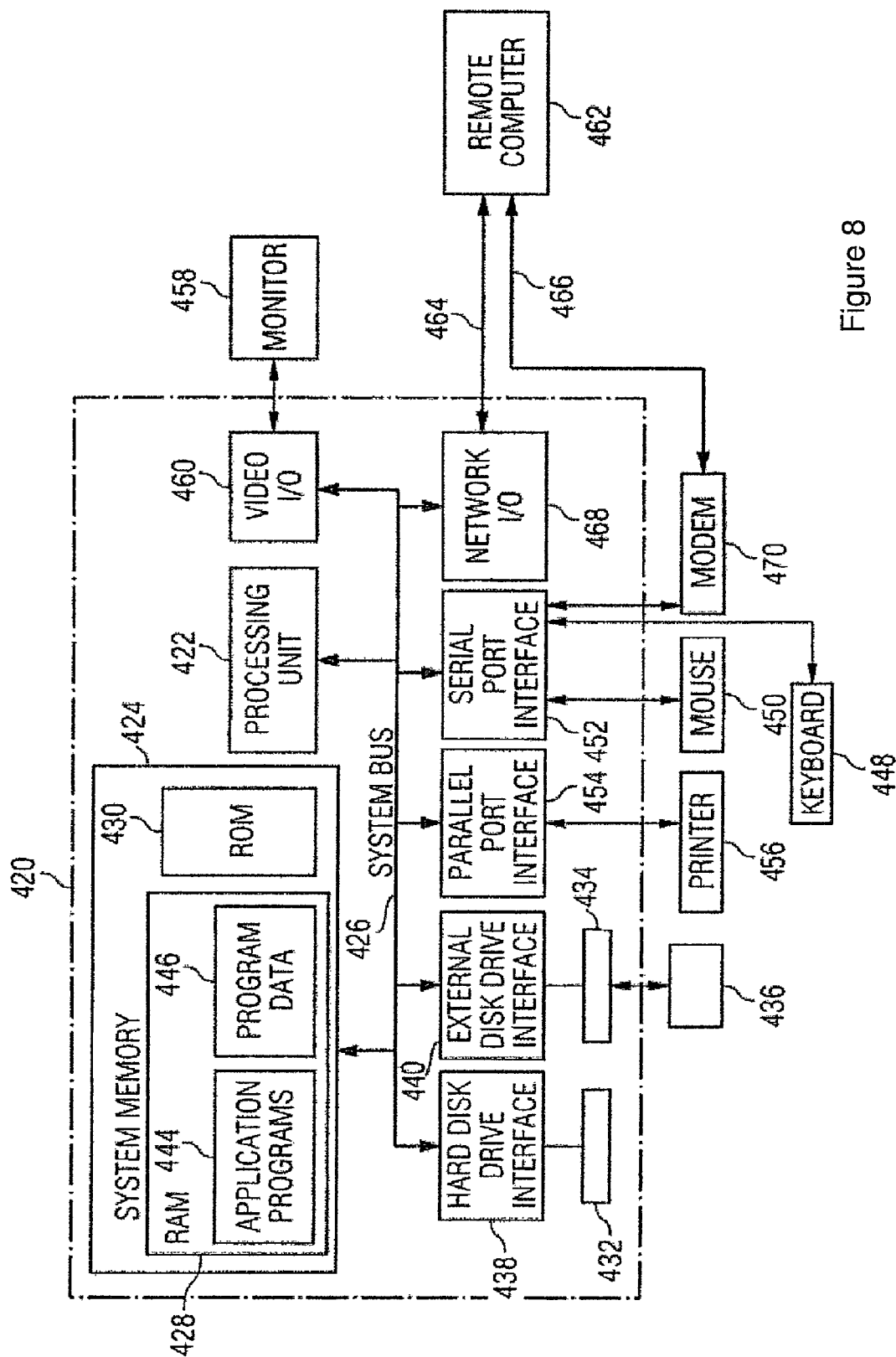
FIG. 8 shows a block diagram of an exemplary computer (network) system.

With reference to FIG. 8, an exemplary system for implementing the invention includes a general purpose computing device in the form of a conventional computing environment 420 (e.g. personal computer), including a processing unit 422, a system memory 424, and a system bus 426, that couples various system components including the system memory 424 to the processing unit 422. The processing unit 422 may perform arithmetic, logic and/or control operations by accessing system memory 424. The system memory 424 may store information and/or instructions for use in combination with processing unit 422. The system memory 424 may include volatile and non-volatile memory, such as random access memory (RAM) 428 and read only memory (ROM) 430. A basic input/output system (BIOS) containing the basic routines that helps to transfer information between elements within the personal computer 420, such as during start-up, may be stored in ROM 430. The system bus 426 may be any of several types of bus structures including a memory bus or memory controller, a peripheral bus, and a local bus using any of a variety of bus architectures.

The personal computer 420 may further include a hard disk drive 432 for reading from and writing to a hard disk (not shown), and an external disk drive 434 for reading from or writing to a removable disk 436. The removable disk 436 may be a magnetic disk for a magnetic disk driver or an optical disk such as a CD ROM for an optical disk drive. The hard disk drive 434 and external disk drive 434 are connected to the system bus 426 by a hard disk drive interface 438 and an external disk drive interface 440, respectively. The drives and their associated computer-readable media provide nonvolatile storage of computer readable instructions, data structures, program modules and other data for the personal computer 420. The data structures may include relevant data of the implementation of the computer-implemented method, system, and computer program product for automatically generating a digital signature for a message, and of the implementation of the computer-implemented method, system, and computer program product for automatically verifying a digital signature of a message as described in more detail above. The relevant data may be organized in a database, for example a relational or object database.

Although the exemplary environment described herein employs a hard disk (not shown) and an external disk, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk, ROM 430 or RAM 428, including an operating system (not shown), one or more application programs 444, other program modules (not shown), and program data 446. The application programs 444 may include at least a part of the functionality as detailed in FIGS. 1 to 3.

A user may enter commands and information, as discussed below, into the personal computer 420 through input devices such as keyboard 448 and mouse 450. Other input devices (not shown) may include a microphone (or other sensors), joystick, game pad, scanner, or the like. These and other input devices may be connected to the processing unit 422 through a serial port interface 452 that is coupled to the system bus 426, or may be collected by other interfaces, such as a parallel port interface 454, game port or a universal serial bus (USB). Further, information may be printed using printer 456. The printer 456 and other parallel input/output devices may be connected to the processing unit 422 through parallel port interface 454. A monitor 458 or other type of display device is also connected to the system bus 426 via an interface, such as a video input/output 460. In addition to the monitor, computing environment 420 may include other peripheral output devices (not shown), such as speakers or other audible output.

The computing environment 420 may communicate with other electronic devices such as a computer, telephone (wired or wireless), personal digital assistant, television, or the like. To communicate, the computer environment 420 may operate in a networked environment using connections to one or more electronic devices. FIG. 8 depicts the computer environment networked with remote computer 462. The remote computer 462 may be another computing environment such as a server, a router, a network PC, a peer device or other common network node, and may include many or all of the elements described above relative to the computing environment 420. The logical connections depicted in FIG. 8 include a local area network (LAN) 464 and a wide area network (WAN)

466. Such networking environments are commonplace in offices, enterprise-wide computer networks, intranets and the Internet.

When used in a LAN networking environment, the computing environment 420 may be connected to the LAN 464 through a network I/O 468. When used in a WAN networking environment, the computing environment 420 may include a modem 470 or other means for establishing communications over the WAN 466. The modem 470, which may be internal or external to computing environment 420, is connected to the system bus 426 via the serial port interface 452. In a networked environment, program modules depicted relative to the computing environment 420, or portions thereof, may be stored in a remote memory storage device resident on or accessible to remote computer 462. Furthermore other data relevant to the application of the signature generation and verification methods (described in more detail further above) may be resident on or accessible via the remote computer 462. The data may be stored for example in an object or a relation database. It will be appreciated that the network connections shown are exemplary and other means of establishing a communications link between the electronic devices may be used.

The above-described computing system is only one example of the type of computing system that may be used to implement the method for automatically generating a digital signature for a message and to implement the method for automatically verifying a digital signature of a message.

LIST OF REFERENCE NUMERALS

10 XML signature schema
10a signature sub-tree
11 signature element
12 URI attribute
13 reference element
13-1, 13-2 reference element
14 SignedInfo element
15 CanonicalizationMethod element
16 DigestValue element
17 KeyInfo element
18 SignatureMethod element
19 SignatureValue element
20 tree representation of a message
21 Envelope element
22 Header element
23 Body sub-tree
24 Body element
25 Security element
26 ReplyTo sub-tree
27 ReplyTo element
28 TimeStamp element
30 rewriting of message 20
Bogus-header element
32 newBody sub-tree
33 newBody element
40 rewriting of message 20
41 (modified) ReplyTo sub-tree
42 Bogus-header element
50 rewriting of a message
51 (further) Security element
52 (further) URI attribute
100 signature generation method
102 input operation
104 node selection operation
106 canonicalization operation
108 context generation operation
110 digests generation operation
112 encryption operation
114 storing operation
200 signature verification method
202 input operation
204 sub-message selection operation
206 canonicalization operation
208 decryption operation
210 failure operation
212, 218, 222, 226 invalidity operation
214 digest generation operation
216 context digest comparison operation
220 derivation generation operation
224 message digest comparison operation
228 validity operation
420 computing environment
422 processing unit
424 system memory
426 system bus
428 random access memory (RAM)
430 read only memory (ROM)
432 hard disk drive
434 external disk drive
436 removable disk
438 hard disk drive interface
440 external disk drive interface
444 application program
446 program data
448 keyboard
450 mouse
452 serial port interface
454 parallel port interface
456 printer
458 monitor
460 video input/output
462 remote computer
464 local area network (LAN)
466 wide area network (WAN)
468 network I/O
470 a modem

What is claimed is:

1. A computer-implemented method for automatically generating a digital signature for a message $M_T$, the message $M_T$ being representable in a hierarchical tree structure, the method comprising;

selecting, from the message $M_T$, a sub-message M to be signed, the sub-message M comprising at least one element;

generating a well-formed context $C_M^t$ for the sub-message M, the well-formed context $C_M^t$ defining a derivation path to the element in the message $M_T$ at a time t and marking the element [M] in the well-formed context $C_M^t$, the generating of the well-formed context being performed by a processor of a device;

generating a message digest $\delta_M$ from the sub-message M and a context digest $\delta_C$ from the well-formed context $C_M^t$; and generating a signature S by applying a secret key $S_A$ of a user A to the message digest $\delta_M$ and to the context digest $\delta_C$.

2. A computer-implemented method for automatically verifying a digital signature of a message $M_T$, the message $M_T$ being representable in a hierarchical tree structure, the method comprising:

receiving the message $M_T$ comprising a signature S, the signature S being associated with a well-formed context $C_M^t$;

selecting, from the message $M_T$, a sub-message M to be verified;

decrypting the signature S with a key $p_A$ of a user A, the decrypted signature comprising a message digest $\delta_M$ and a context digest $\delta_C$;

generating a further message digest $\delta'_M$ from the sub-message M and a further context digest $\delta'_C$ from the well-formed context $C_m^t$; and verifying the signature S by checking:
whether the further context digest $\delta'_C$ equals the context digest $\delta_C$,
whether the sub-message M is in a derivation path through the message $M_T$ to a marked element [M], the derivation path being generated from the well-formed context $C_M^t$, and
whether the further message digest $\delta'_M$ equals the message digest $\delta_M$,
the verifying of the signature being performed by a processor of a device.

3. A computer-implemented method according to claim 1, wherein the well-formed context $C_M^t$ is generated by one or more well-formed production rules of a regular tree grammar (RTG), the well-formed production rules being used to define the derivation path to the element [M] in the message $M_T$.

4. A computer-implemented method according to claim 3, wherein the well-formed production rules unambiguously define only said derivation path through the message $M_T$ to the element [M].

5. A computer-implemented method according to claim 3, wherein a regular expression occurring in at least one of the one or more well-formed production rules and comprising multiple occurrences of an element is replaced by an equivalent regular expression determining one of the multiple occurrences of said element to be used in the derivation path.

6. A computer-implemented method according to claim 1, the method further comprising:
storing the signature S and the well-formed context $C_M^t$ in an information element of the message $M_T$.

7. A computer-implemented method according to claim 2, the method further comprising:
incorporating the sub-message M in a new message $M_{T2}$;
generating a new well-formed context $C_M^{tc}$ for the sub-message M, wherein the new well-formed context $C_M^{tc}$ defines a new derivation path to the element [M] in the new message $M_{T2}$ at a time $t_C$; and
generating a new signature $S_2$ comprising the sub-message M signed by the user A and the new well-formed context $C_M^{tc}$ signed by a user B.

8. A non-transitory computer-readable storage medium comprising instructions that, when executed by one or more processors of a device, cause the device to perform operations comprising:
selecting, from the message $M_T$, a sub-message M to be signed, the sub-message M comprising at least one element;
generating a well-formed context $C_M^t$ for the sub-message M, the well-formed context $C_M^t$ defining a derivation path to the element in the message $M_T$ at a time t and marking the element [M] in the well-formed context $C_M^t$, the generating of the well-formed context being performed by the one or more processors of the device;
generating a message digest $\delta_M$ from the sub-message M and a context digest $\delta_C$ from the well-formed context $C_M^t$; and
generating a signature S by applying a secret key $s_A$ of a user A to the message digest $\delta_M$ and to the context digest $\delta_C$.

9. A computer system for automatically generating a digital signature for a message $M_T$, the message $M_T$ being representable in a hierarchical tree structure, the system comprising:
a first module configured to select, from a message $M_T$, a sub-message M to be signed, the sub-message M comprising at least one element;
a second module configured to generate a well-formed context $C_M^t$ for the sub-message M, the well-formed context $C_M^t$ defining a derivation path to the element in the message $M_T$ at a time t and marking the element [M] in the well-formed context $C_M^t$;
a processor configured by a third module to generate a message digest $\delta_M$ from the sub-message M and a context digest $\delta_C$ from the well-formed context $C_M^t$; and
a fourth module configured to generate a signature S by applying a secret key $s_A$ of a user A to the message digest $\delta_M$ and to the context digest $\delta_C$.

10. A computer system for automatically verifying a digital signature of a message $M_T$, the message $M_T$ being representable in a hierarchical tree structure, the system comprising:
a first module configured to receive the message $M_T$ comprising a signature S, the signature S being associated with a well-formed context $C_M^t$;
a second module configured to select, from the message $M_T$, a sub-message M to be verified;
a third module configured to decrypt the signature S with a public key $p_A$ of a user A, the decrypted signature comprising a message digest $\delta_M$ and a context digest $\delta_C$;
a processor configured by a fourth module to generate a further message digest $\delta'_M$ from the sub-message M and a further context digest $\delta'_C$ from the well-formed context $C_M^t$; and
a fifth module configured to verify the signature by checking:
whether the further context digest $\delta'_C$ equals the context digest $\delta_C$,
whether the sub-message M is in a derivation path through the message $M_T$ to a marked element [M], the derivation path being generated from the well-formed context $C_M^t$, and
whether the further message digest $\delta'_M$ equals the message digest $\delta_M$.

11. A computer system according to claim 9, wherein the well-formed context $C_M^t$ is generated by one or more well-formed production rules of a regular tree grammar (RTG), the well-formed production rules being used to define the derivation path to the element [M] in the message $M_T$.

12. A computer system according to claim 11, wherein the well-formed production rules unambiguously define only said derivation path through the message $M_T$ to the element [M].

13. A computer system according to claim 11, wherein a regular expression occurring in at least one of the one or more well-formed production rules and comprising multiple occurrences of an element is replaced by an equivalent regular expression determining one of the multiple occurrences of said element to be used in the derivation path.

14. A computer system according to claim 9, further comprising a fifth module configured to:
store the signature S and the well-formed context $C_M^t$, in an information element of the message $M_T$.

15. A computer system according to claim 10, further comprising a sixth module configured to:
incorporate the sub-message M in a new message $M_{T2}$;
generate a new well-formed context $C_M^{tc}$ for the sub-message M, wherein the new well-formed context $C_M^{tc}$ defines a new derivation path to the element [M] in the new message $M_{T2}$ at a time $t_C$; and generate a new signature $S_2$ comprising the sub-message M signed by the user A and the new well-formed context $C_M^{tc}$ signed by a user B.

16. A non-transitory computer-readable storage medium comprising instructions that, when executed by one or more processors of a device, cause the device to perform operations comprising:

receiving the message $M_T$ comprising a signature S, the signature S being associated with a well-formed context $c_M^t$;

selecting, from the message $M_T$, a sub-message M to be verified;

decrypting the signature S with a key $p_A$ of a user A, the decrypted signature comprising a message digest $\delta'_M$ and a context digest $\delta_C$;

generating a further message digest $\delta'_M$ from the sub-message M and a further context digest $\delta'_C$ from the well-formed context $C_M^t$; and verifying the signature S by checking:
whether the further context digest $\delta'_C$ equals the context digest $\delta_C$,
whether the sub-message M is in a derivation path through the message $M_T$ to a marked element [M], the derivation path being generated from the well-formed context $C_M^t$, and
whether the further message digest $\delta'_M$ equals the message digest $\delta_M$,
the verifying of the signature being performed by the one or more processors of the device.

17. A non-transitory computer readable storage medium according to claim 16, the operations further comprising:

incorporating the sub-message M in a new message $M_{T2}$;

generating a new well-formed context $C_M^{tc}$ for the sub-message M, wherein the new well-formed context $C_M^{tc}$ defines a new derivation path to the element [M] in the new message $M_{T2}$ at a time $t_c$; and generating a new signature $S_2$ comprising the sub-message M signed by the user A and the new well-formed context $C_M^{tc}$ signed by a user B.

18. A non-transitory computer-readable storage medium according to claim 8, wherein the well-formed context $C_M^t$ is generated by one or more well-formed production rules of a regular tree grammar (RTG), the well-formed production rules being used to define the derivation path to the element [M] in the message $M_T$.

19. A non-transitory computer-readable storage medium according to claim 8, the operations further comprising:

storing the signature S and the well-formed context $C_M^t$ in an information element of the message $M_T$.

20. A computer system according to claim 9, wherein the well-formed context $C_M^t$ is generated by one or more well-formed production rules of a regular tree grammar (RTG), the well-formed production rules being used to define the derivation path to the element [M] in the message $M_T$.

* * * * *